(12) United States Patent
Moriai et al.

(10) Patent No.: US 9,014,866 B2
(45) Date of Patent: Apr. 21, 2015

(54) POWER SUPPLY DEVICE

(75) Inventors: Shiho Moriai, Kanagawa (JP); Tsuyoshi Masato, Kanagawa (JP); Shinichi Uesaka, Kanagawa (JP); Atsushi Ozawa, Kanagawa (JP); Masanobu Katagi, Kanagawa (JP); Tomoyuki Ono, Saitama (JP); Kazuhito Tsuchida, Tokyo (JP); Shin Hotta, Tokyo (JP); Kazuo Nakamura, Kanagawa (JP); Kentaro Marutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 13/230,148

(22) Filed: Sep. 12, 2011

(65) Prior Publication Data

US 2012/0072042 A1 Mar. 22, 2012

(30) Foreign Application Priority Data

Sep. 16, 2010 (JP) .................................. 2010-207713

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G06F 17/00 | (2006.01) |
| H02J 7/34 | (2006.01) |
| H02J 7/00 | (2006.01) |
| H01M 10/44 | (2006.01) |
| H01M 10/48 | (2006.01) |

(52) U.S. Cl.
CPC ................. *H02J 7/34* (2013.01); *H02J 7/0013* (2013.01); *H02J 7/0042* (2013.01); *H01M 10/441* (2013.01); *H01M 10/482* (2013.01)

(58) Field of Classification Search
CPC ............. H02J 3/382; H02J 3/06; G06G 7/635
USPC ........................................... 700/297, 90, 286
See application file for complete search history.

(56) References Cited

U.S. PATENT DOCUMENTS

| 4,858,141 A | 8/1989 | Hart et al. |
| 5,248,927 A * | 9/1993 | Takei et al. .................... 320/113 |

(Continued)

FOREIGN PATENT DOCUMENTS

| JP | 1996308104 | 11/1996 |
| JP | 2001330630 | 11/2001 |

(Continued)

OTHER PUBLICATIONS

Inagaki et al., "Nonintrusive Appliance Load Monitoring System—Discrete Operating Conditions and Integer Programming," Measurement Automatic Control Academic Society Disaggregation System Conference lecture collection of papers No. 42, pp. 33-38, Dec. 20, 2008. (6 pages).

*Primary Examiner* — Mohammad Ali
*Assistant Examiner* — Ziaul Karim
(74) *Attorney, Agent, or Firm* — K&L Gates LLP

(57) ABSTRACT

A power supply device including: (a) a power supply unit group composed of a plurality of power supply units and connected with a power consuming appliance; and (b) a control device configured to control the power supply unit group, wherein the control device and each of the power supply units are connected to each other by a communicating circuit.

8 Claims, 10 Drawing Sheets

(56) References Cited

U.S. PATENT DOCUMENTS

| | | |
|---|---|---|
| 2003/0093390 A1 | 5/2003 | Onoda et al. |
| 2004/0107025 A1* | 6/2004 | Ransom et al. ............... 700/286 |
| 2005/0116836 A1* | 6/2005 | Perry et al. ............... 340/870.02 |
| 2007/0089163 A1* | 4/2007 | Denton ............................. 726/2 |
| 2008/0077811 A1* | 3/2008 | Dove ............................ 700/297 |
| 2008/0177678 A1* | 7/2008 | Di Martini et al. ............ 705/412 |
| 2009/0088907 A1* | 4/2009 | Lewis et al. ................... 700/286 |
| 2009/0195349 A1* | 8/2009 | Frader-Thompson et al. 340/3.1 |
| 2010/0076835 A1* | 3/2010 | Silverman .................. 705/14.33 |
| 2011/0080044 A1* | 4/2011 | Schmiegel ..................... 307/23 |
| 2011/0185303 A1* | 7/2011 | Katagi et al. .................. 715/771 |
| 2012/0205977 A1* | 8/2012 | Shin et al. ........................ 307/26 |
| 2012/0223840 A1* | 9/2012 | Guymon et al. ......... 340/870.02 |

FOREIGN PATENT DOCUMENTS

| | | |
|---|---|---|
| JP | 2002010519 | 1/2002 |
| JP | 2004023879 | 1/2004 |
| JP | 2006017456 | 1/2006 |
| JP | 2008039492 | 2/2008 |
| JP | 2009257952 | 11/2009 |
| WO | 0177696 | 4/2001 |

\* cited by examiner

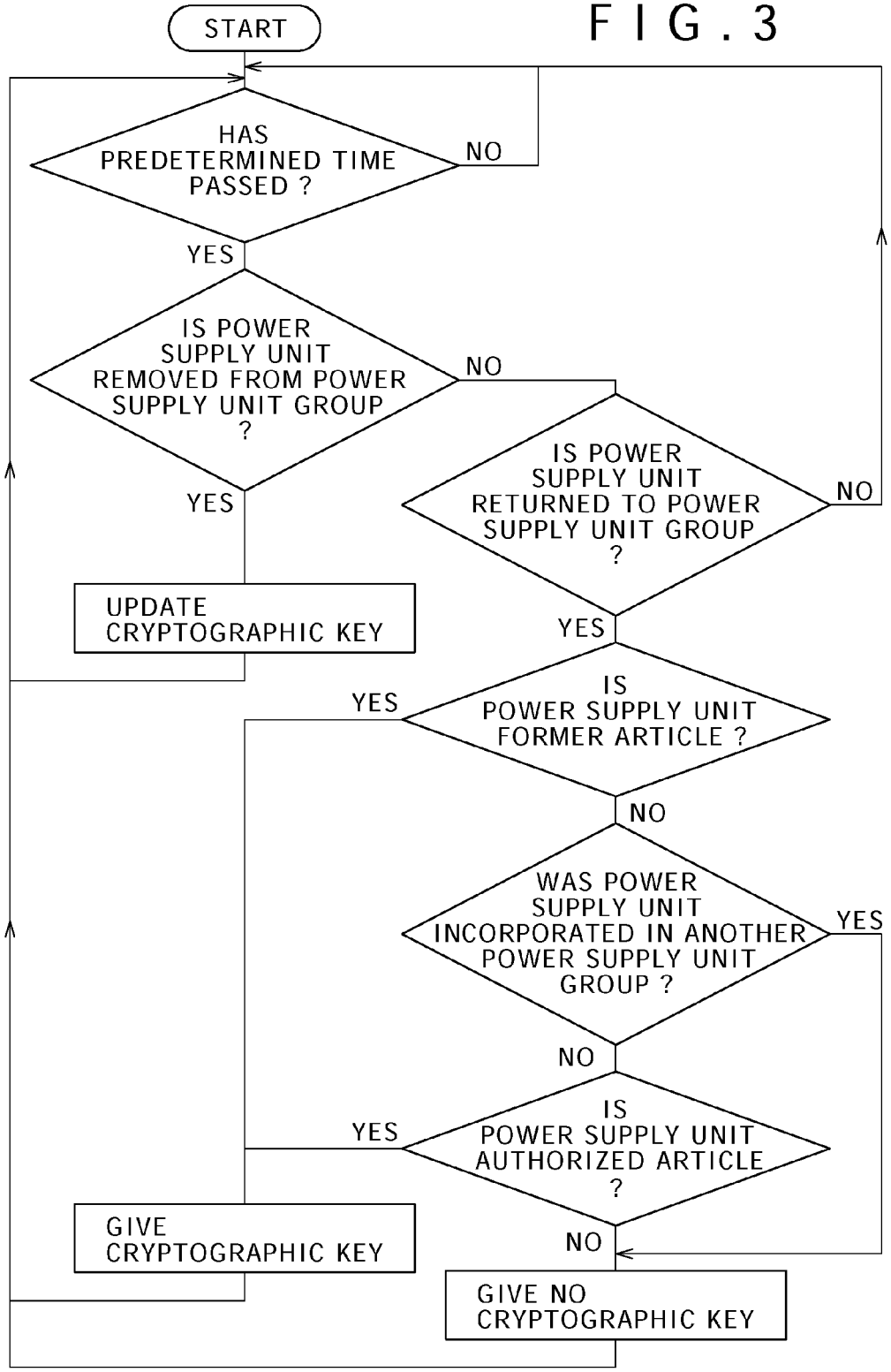

POWER SUPPLY DEVICE

CROSS REFERENCES TO RELATED APPLICATIONS

The present application claims priority to Japanese Priority Patent Application JP 2010-207713 filed in the Japan Patent Office on Sep. 16, 2010, the entire content of which is hereby incorporated by reference.

BACKGROUND

The present application relates to a power supply device.

A power supply device in which a solar battery and a secondary battery are combined with each other and which controls the operation of these batteries by a control device is well known from Japanese Patent Laid-Open No. 2004-023879, for example. In addition, a remote device including a secondary battery, a solar battery, and a control device is well known from Japanese Patent Laid-Open No. 2002-010519. Further, a decentralized power supply system including a decentralized power supply and a secondary battery is well known from Japanese Patent Laid-Open No. Hei 8-308104.

SUMMARY

However, in the techniques disclosed in these patent laid-open publications, when the solar battery, the power supply, or the secondary battery (which may hereinafter be referred to collectively as a "secondary battery or the like") is removed from the power supply device, the remote device, or the decentralized power supply system (which may hereinafter be referred to collectively as a "power supply device or the like"), and the secondary battery or the like is incorporated into the power supply device or the like again, no verification is performed as to whether the secondary battery or the like is a regular or authorized product. In a case where the secondary battery or the like is a non-regular or unauthorized product, various problems and inconveniences may occur when the non-regular or unauthorized product is incorporated into the power supply device or the like.

In addition, these patent laid-open publications include no references to:

(1) how to select a secondary battery that needs charging depending on the state of power generation of a power generating device and the states of charge and discharge in secondary batteries;

(2) which secondary battery to use depending on the states of power consumption of power consuming appliances connected to the secondary batteries and the states of charge and discharge in the secondary batteries; and (3) to which secondary battery to transfer power to achieve averaging depending on the states of charge and discharge in the secondary batteries.

Accordingly, it is desirable to provide a power supply device that makes it possible to incorporate a secondary battery or the like into the power supply device or the like safely. In addition, it is desirable to provide a power supply device that can easily select a power supply unit that needs charging depending on the state of power generation of a power generating device and the states of charge and discharge in power supply units. Further, it is desirable to provide a power supply device that can easily select which power supply unit to use depending on the states of power consumption of power consuming appliances connected to the power supply units and the states of charge and discharge in the power supply units. In addition, it is desirable to provide a power supply device that can easily select to which power supply unit to transfer power to achieve averaging depending on the states of charge and discharge in the power supply units.

According to a first mode, there is provided a power supply device including: (a) a power supply unit group composed of a plurality of power supply units and connected with a power consuming appliance; and (b) a control device configured to control the power supply unit group. In the power supply device, the control device and each of the power supply units are connected to each other by a communicating circuit, when a power supply unit is removed from the power supply unit group, the control device updates a cryptographic key shared to perform communication between the control device and each of the power supply units, and when the power supply unit is returned to the power supply unit group, the control device checks whether the power supply unit in question is the power supply unit removed from the power supply unit group, and when the power supply unit in question is the power supply unit removed from the power supply unit group, the control device sends the cryptographic key to the power supply unit in question.

According to a second mode, there is provided a power supply device including: (a) a power supply unit group composed of a plurality of power supply units and connected to a power generating device; and (b) a control device configured to control the power supply unit group, the control device having a display device and a selecting device. In the power supply device, the display device displays a state of power generation of the power generating device and a state of charge and discharge of each of the power supply units, and on a basis of a selection from the selecting device, the control device selects a power supply unit to supply power from the power generating device to the selected power supply unit and charge the power supply unit.

According to a third mode, there is provided a power supply device including: (a) a power supply unit group composed of a plurality of power supply units and connected with a power consuming appliance; and (b) a control device configured to control the power supply unit group, the control device having a display device and a selecting device. In the power supply device, the display device displays a state of power consumption of the power consuming appliance and a state of charge and discharge of each of the power supply units, and on a basis of a selection from the selecting device, the control device selects a power supply unit to supply power from the selected power supply unit to the power consuming appliance.

According to a fourth mode, there is provided a power supply device including: (a) a power supply unit group composed of a plurality of power supply units; and (b) a control device configured to control the power supply unit group, the control device having a display device and a selecting device. In the power supply device, the display device displays a state of charge and discharge of each of the power supply units, and on a basis of a selection from the selecting device, the control device selects a power supply unit to output power and a power supply unit to receive (be supplied with) power, and makes power transferred from the selected power supply unit to output power to the selected power supply unit to receive (be supplied with) power.

In the power supply device according to the first mode, when a power supply unit is removed from the power supply unit group, the control device updates a cryptographic key shared to perform communication between the control device and each of the power supply units. Thus, even in a case where the cryptographic key is extracted by analyzing the power supply unit removed from the power supply unit group, and the cryptographic key is incorporated into another power supply unit, or in a case where an attempt is made to incorporate a different power supply unit into the power supply unit group, the cryptographic key does not coincide when an attempt is made to incorporate these power supply units into the power supply unit group. Thereby, the operation of these power supply units is prohibited, and these power supply units do not function.

In the power supply device according to the second mode, the display device displays a state of power generation of the power generating device and a state of charge and discharge of each of the power supply units, and on a basis of a selection from the selecting device, the control device selects a power supply unit. It is therefore possible to easily select a power supply unit that needs charging depending on the state of power generation of the power generating device and the states of charge and discharge of the power supply units. In addition, in the power supply device according to the third mode, the display device displays a state of power consumption of the power consuming appliance and a state of charge and discharge of each of the power supply units, and on a basis of a selection from the selecting device, the control device selects a power supply unit. It is therefore possible to easily select which power supply unit to use depending on the states of power consumption of power consuming appliances connected to the power supply units and the states of charge and discharge of the power supply units. Further, in the power supply device according to the fourth mode, the display device displays a state of charge and discharge of each of the power supply units, and on a basis of a selection from the selecting device, the control device selects a power supply unit to output power and a power supply unit to receive (be supplied with) power. It is therefore possible to easily select to which power supply unit to transfer power to achieve averaging, for example, depending on the states of charge and discharge of the power supply units.

Additional features and advantages are described herein, and will be apparent from the following Detailed Description and the figures.

BRIEF DESCRIPTION OF THE FIGURES

FIG. 3 is a diagram showing a flow of operation in the power supply device according to the first embodiment;

DETAILED DESCRIPTION

Figure 1A:
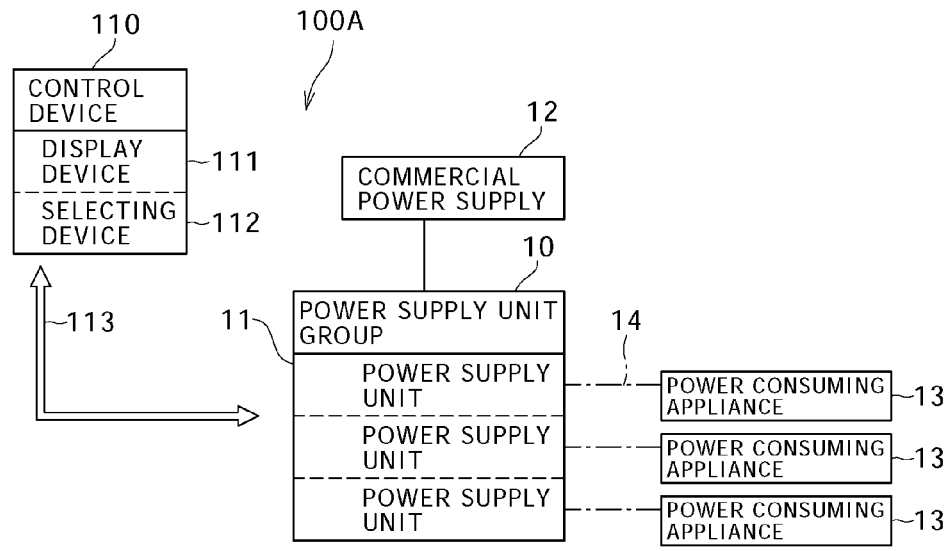
FIGS. 1A and 1B are conceptual diagrams of power supply devices according to a first embodiment and a second embodiment.

Embodiments of the present application will be described below in detail with reference to the drawings.

However, the present technology is not limited to the embodiments, and various numerical values and materials in the embodiments are illustrative. Incidentally, description will be made in the following order.

1. Description of Power Supply Devices according to First to Fourth Mode of Present Application and Generals 2. First Embodiment (Power Supply Device according to First Mode of Present Application)

3. Second Embodiment (Modification of First Embodiment)

4. Third Embodiment (Modification of First Embodiment and Power Supply Device according to 1A Mode of Present Application)

5. Fourth Embodiment (Modification of First Embodiment and Power Supply Device according to 1B Mode of Present Application)

6. Fifth Embodiment (Power Supply Device according to Second Mode of Present Application)

7. Sixth Embodiment (Power Supply Device according to Third Mode of Present Application)

8. Seventh Embodiment (Power Supply Device according to Fourth Mode of Present Application)

9. Eighth Embodiment (One Concrete Example of Power Supply Unit)

10. Ninth Embodiment (Modifications of First to Seventh Embodiments) and Others

A power supply device according to a first mode can take a form in which when a power supply unit is returned to a power supply unit group, a control device checks whether the power supply unit in question is a power supply unit removed from the power supply unit group, and when the power supply unit in question is not a power supply unit removed from the power supply unit group, the control device does not send a cryptographic key to the power supply unit in question and blocks communication between the control device and the power supply unit in question. The power supply device according to the first mode including such a form can take a form in which when an authorized power supply unit (regular power supply unit, the same being true in the following), the authorized power supply unit not being a power supply unit removed from the power supply unit group, is incorporated into the power supply unit group, the control device checks whether the power supply unit in question is an authorized power supply unit, and when the power supply unit in question is an authorized power supply unit, the control device sends the cryptographic key to the power supply unit in question. Further, the power supply device according to the first mode including these preferable forms can take a form in which when an unauthorized power supply unit (non-regular power supply unit, the same being true in the following) is incorporated into the power supply unit group, the control device checks whether the power supply unit in question is an authorized power supply unit, and when the power supply unit in question is an unauthorized power supply unit, the control device does not send the cryptographic key to the power supply unit in question and blocks communication between the control device and the power supply unit in question.

Further, the power supply device according to the first mode including the various preferable forms described above can have a configuration further including a power generating device, wherein the control device and the power generating device are connected to each other by a communicating circuit, when communication between the power generating device and the control device is blocked, the control device updates the cryptographic key, and when the communication between the power generating device and the control device is restored, the control device checks whether the power generating device in question is the power generating device when the communication between the power generating device and the control device was blocked, and when the power generating device in question is the power generating device when the communication between the power generating device and the control device was blocked, the control device sends the cryptographic key to the power generating device in question. Incidentally, the power supply device of such a configuration will be referred to as a "power supply device according to a 1A mode" for convenience. The power supply device according to the 1A mode can take a form in which when an authorized power generating device (regular power generating device, the same being true in the following), though the authorized power generating device is not the power generating device when the communication between the power generating device and the control device was blocked, is connected to the control device by a communicating circuit, the control device checks whether the power generating device in question is an authorized power generating device, and when the power generating device in question is an authorized power generating device, the control device sends the cryptographic key to the power generating device in question. The power supply device according to the 1A mode including such a form can take a form in which when an unauthorized power generating device (non-regular power generating device, the same being true in the following) is connected to the control device by a communicating circuit, the control device checks whether the power generating device in question is an authorized power generating device, and when the power generating device in question is an unauthorized power generating device, the control device does not send the cryptographic key to the power generating device in question and blocks communication between the control device and the power generating device in question.

Further, the power supply device according to the first mode including the various preferable forms described above and the power supply device according to the 1A mode can have a configuration in which the control device and a power consuming appliance are connected to each other by a communicating circuit, when communication between the power consuming appliance and the control device is blocked, the control device updates the cryptographic key, and when the communication between the power consuming appliance and the control device is restored, the control device checks whether the power consuming appliance in question is the power consuming appliance when the communication between the power consuming appliance and the control device was blocked, and when the power consuming appliance in question is the power consuming appliance when the communication between the power consuming appliance and the control device was blocked, the control device sends the cryptographic key to the power consuming appliance in question. Incidentally, the power supply device of such a configuration will be referred to as a "power supply device according to a 1B mode" for convenience. The power supply device according to the 1B mode can take a form in which when an authorized power consuming appliance (regular power consuming appliance, the same being true in the following), though the authorized power consuming appliance is not the power consuming appliance when the communication between the power consuming appliance and the control device was blocked, is connected to the control device by a communicating circuit, the control device checks whether the power consuming appliance in question is an authorized power consuming appliance, and when the power consuming appliance in question is an authorized power consuming appliance, the control device sends the cryptographic key to the power consuming appliance in question. The power supply device according to the 1B mode including such a form can take a form in which when an unauthorized power consuming appliance (non-regular power consuming appliance, the same being true in the following) is connected to the control device by a communicating circuit, the control device checks whether the power consuming appliance in question is an authorized power consuming appliance, and when the power consuming appliance in question is an unauthorized power consuming appliance, the control device does not send the cryptographic key to the power consuming appliance in question and blocks communication between the control device and the power consuming appliance in question.

A power supply device according to a third mode can take a form of further including a power generating device connected to a power supply unit group, wherein a display device displays a state of power generation of the power generating device, and a control device selects a power supply unit on a basis of a selection from a selecting device to supply power from the power generating device to the selected power supply unit and charge the power supply unit.

The power supply device according to the third mode including such a preferable form or a power supply device according to a second mode can have a configuration in which the power generating device and the power supply unit group are connected to each other via a radio power transmission circuit. Concrete examples of the radio power transmission circuit (radio power transmission system) in this case include radio power transmission circuits of an electromagnetic induction system, a magnetic resonance system and the like. For example, power generated by a photovoltaic power generation system installed outdoors can be transmitted indoors without passing through wiring, and stored in the power supply unit group. This entirely eliminates a need for interior wiring work and the like that have been necessary in the past, and can therefore provide an optimum system for power transmission between a veranda and the inside of a room in collective housing, in particular. However, the radio power transmission circuit is not limited to these examples.

Further, the power supply devices according to the first to fourth modes including the various preferable forms and configurations described above can have a configuration further including a portable terminal including a display device, wherein the control device and the portable terminal are connected to each other by a communicating circuit. Thereby, a state of operation of the power supply devices can be checked even at a remote place. Further, a configuration can be formed in which mutual authentication is performed between the control device and the portable terminal at a time of connection, a cryptographic key is shared between the control device and the portable terminal, and communication encrypted by the cryptographic key is performed between the control device and the portable terminal. Examples of the portable terminal in this case include a portable telephone, a PDA (Personal Digital Assistant), a smart phone, a notebook personal computer, and a tablet computer. However, the portable terminal is not limited to these examples.

Further, the power supply devices according to the first to fourth modes including the various preferable forms and configurations described above can have, though not limited to, a configuration in which the power supply units include: (A) a casing having a shape of a prism; (B) a secondary battery cell housed within the casing; (C) a charge and discharge controlling device housed within the casing and connected to the secondary battery cell; (D) at least one power input section disposed in the casing and connected to the charge and discharge controlling device; and (E) at least one power output section disposed in the casing and connected to the charge and discharge controlling device. Incidentally, a power supply unit of such a configuration will be referred to as a "power supply unit in one embodiment" for convenience.

The shape of the casing of a power supply unit in one embodiment is a prism, and a plurality of power supply units can be combined with each other. In addition, because at least one power input section and at least one power output section are disposed in the casing, the plurality of power supply units can be combined with each other easily by connecting power input sections and power output sections of the power supply units adjacent to each other. In addition, for example, a plurality of various power supply units different in capacity can be combined with each other and used as one power supply unit group as a whole, that is, can be used as one power supply unit group as a whole in a state of being mixed with each other. Thus, fields of application of power supply units can be expanded, and flexible provision can be made for various requests in the fields of application. Further, for example, a plurality of various power supply units different in degree of degradation, use time, the number of charges or the like can be combined with each other and used as one power supply unit group as a whole, that is, can be used as one power supply unit group as a whole in a state of being mixed with each other, and secondary battery cells different in capacity, voltage or the like can be used as a whole to construct one power supply unit group.

In the power supply devices according to the first to fourth modes including the various preferable forms and configurations described above (these power supply devices may be collectively referred to simply as a power supply device according to one embodiment), a minimum number of power supply units is two, and there is no particular upper limit to the number of power supply units.

In the power supply device according to one embodiment, the power consuming appliance is connected to the power supply unit group. However, one or a plurality of power consuming appliances may be connected to one part of the power supply unit group, or one or a plurality of power consuming appliances may be connected to a plurality of parts of the power supply unit group. The power supply unit group and the power consuming appliance may be connected to each other by using wiring or by adopting a radio power transmission system such as an electromagnetic induction system or a magnetic resonance system, for example. Examples of the power consuming appliance include a personal computer, a television receiver, various display devices, a portable telephone, a PDA, a digital still camera or a video camera, a camcorder, an electronic device such as a music player or the like, a power tool such as an electric drill or the like, a lighting fixture such as an interior light or the like, a power supply unit or a home energy server (storage device for household use), a medical device, a toy or the like, a portable device, a DC amplifier, an audio-visual device such as a speaker or the like, various household electric appliances, a (wireless) feeding pad, an electric motorcycle, and the like. However, the power consuming appliance is not limited to these examples. In some cases, a power supply unit and a power consuming appliance may be integral with each other. In addition, a power supply in the power supply device according to one embodiment includes a commercial power supply and a power generating device. Examples of the power generating device in the power supply device according to one embodiment include various solar batteries, a fuel cell, a bio battery, a wind power generating device, a micro hydroelectric power generating device, a geothermal power generating device and the like, and various energy harvesting devices. However, the power generating device is not limited to these examples. The power generating device may be connected to one part of the power supply unit group, or may be connected to a plurality of parts of the power supply unit group. In addition, the power generating device is not limited to one power generating device, but a plurality of power generating devices may be used.

Examples of the communicating circuit (communicating means) for connecting the control device to each power supply unit, the communicating circuit for connecting the control device to the power generating device, the communicating circuit for connecting the control device to the power consuming appliance, and the communicating circuit for connecting the control device to the portable terminal include a normal telephone line and an optical fiber line including an Internet communication network, ZigBee, radio, a LAN (Local Area Network), RC232, USB (Universal Serial Bus), infrared rays including IrDA (Infrared Data Association), Bluetooth and HomeRF (Home Radio Frequency) as one protocol of wireless LANs, power line communication, or combinations thereof. However, the communicating circuit is not limited to these examples. Incidentally, in the power supply device according to the first mode, the control device and each of the power supply units may be connected to each other by a communicating circuit. Alternatively, the control device and the power supply units may be connected to each other by a communicating circuit via a transmitting and receiving device, and another means (for example the transmitting and receiving device) may detect that a power supply unit is removed from the power supply unit group and that a power supply unit is returned to the power supply unit group.

In the power supply device according to the first mode, a cryptographic key is shared to perform communication between the control device and each power supply unit. Cryptographic technology itself and technology itself relating to the sharing of the cryptographic key can be well known technology. It is desirable that the cryptographic key be stored in the control device and each power supply unit, or further stored in a storage device (for example an EEPROM (Electrically Erasable Programmable Read-Only Memory)) provided to all devices included in the power supply device according to the first mode. In updating the cryptographic key, a new (updated) cryptographic key can be generated from the present cryptographic key by a predetermined function (referred to as a "transition function" for convenience) on the basis of encrypting operation (for example block cipher processing). However, such a transition function is desirably a unique function different for each power supply device. Further, such a transition function is desirably a secret function determined depending on a secret key. Such a transition function can be implemented by using a block cipher, for example. The transition function is desired to make uniform transition between values in a space (for example a space of $\{0, 1\}128$ in the case of a cryptographic key of 128 bits) that can be taken as values of the cryptographic key, not to have a short closed loop (not to make transition in only a set of fixed points), and not to have a fixed point (not to continue assuming a same value after coming to a certain point), for example. Block ciphers known to have sufficient strength such as AES (Advanced Encryption Standard), CLEFIA and the like can be expected to satisfy such requirements. Thereby, unless the transition function or the secret key used in the transition function is leaked, a cryptographic key in the past or in the future cannot be obtained from a cryptographic key at a certain point in time, and security can be ensured even if the cryptographic key at the certain point in time is leaked. In addition, because the transition function is different for each power supply device, a leakage of a cryptographic key from a certain power supply unit does not affect the security of another power supply device. A cryptographic key updating technique itself can be a well known technique. The removal of a power supply unit from a power supply unit group includes not only a case where the power supply unit is physically removed (detached) from the power supply unit group but also a case where communication between the power supply unit and the control device is blocked (including stoppage, disconnection, and the like, the same being true in the following). The control device can detect that a power supply unit is removed from the power supply unit group by well known techniques. Specifically, the control device can for example detect that a power supply unit is removed from the power supply unit group by the following methods.

(1) A physical and electric device such as a switch or the like senses that a power supply unit is physically removed (detached) from the power supply unit group, and the control device obtains a result of the sensing via the communicating circuit.

(2) A power supply unit remaining in the power supply unit group senses a blockage of mutual communication between power supply units, and the control device obtains a result of the sensing via the communicating circuit.

(3) The control device detects that communication between a power supply unit and the control device is blocked.

A power supply unit being returned to the power supply unit group means that the power supply unit is physically incorporated into the power supply unit group and that the power supply unit and the control device are connected to each other by the communicating circuit again.

In the power supply device according to the first mode, at a time of manufacturing or the like, data obtained by connecting an identifying mark (ID) unique to a power supply unit to an initial value of the cryptographic key common to power supply units is stored in the EEPROM of the power supply unit in advance, with a digital signature given to the data. When the power supply unit is returned to the power supply unit group, the control device checks whether the power supply unit is a power supply unit removed from the power supply unit group. Specifically, the control device repeatedly obtains the cryptographic key updated on the basis of the transition function from the cryptographic key stored in the power supply unit when the power supply unit was removed from the power supply unit group, and when the updated cryptographic key coincides with the present cryptographic key, the control device can determine that the power supply unit is a power supply unit removed from the power supply unit group. Alternatively, the control device repeatedly obtains the cryptographic key in the past on the basis of an inverse function of the transition function from the cryptographic key stored in the power supply unit when the power supply unit was removed from the power supply unit group, and when the obtained cryptographic key coincides with the cryptographic key in the past which cryptographic key in the past is stored in the control device, the control device can determine that the power supply unit is a power supply unit removed from the power supply unit group. Alternatively, an identifying mark (for example a random number) generated by the control device when a power supply unit is removed from the power supply unit group may be stored in the storage device provided to the power supply unit and the control device. Thereby, it can be determined that the power supply unit is a power supply unit removed from the power supply unit group on the basis of such an identifying mark. Alternatively, a time when a power supply unit is removed from the power supply unit group may be stored in the storage device provided to the power supply unit and the control device. Thereby, it can be determined that the power supply unit is a power supply unit removed from the power supply unit group on the basis of such a stored time. Alternatively, the digital signature given in advance may be used. Alternatively, these methods may be combined as appropriate. When the power supply unit is a power supply unit removed from the power supply unit group, the cryptographic key is sent to the power supply unit. The cryptographic key is the newest (present) cryptographic key. The cryptographic key is stored in the storage device provided to the power supply unit. Thereby the incorporation of the power supply unit into the power supply unit group is completed.

In the power supply device according to the first mode, when an authorized power supply unit is incorporated into the power supply unit group, the control device checks whether the power supply unit is an authorized power supply unit. Specifically, in a similar manner to that described above, the control device can determine that the power supply unit is an authorized power supply unit on the basis of the initial value of the cryptographic key and the identifying mark (ID) given the digital signature, the initial value of the cryptographic key and the identifying mark being given in advance. When the power supply unit does not have the initial value of the cryptographic key and the identifying mark given the digital signature, it is determined that this power supply unit is an unauthorized power supply unit. When the power supply unit is an authorized power supply unit, the control device sends the cryptographic key to the power supply unit. The cryptographic key is the newest (present) cryptographic key. The cryptographic key is stored in the storage device provided to the power supply unit. Thereby the incorporation of the power supply unit into the power supply unit group is completed. When the power supply unit is an unauthorized power supply unit, on the other hand, the control device does not send the cryptographic key to the power supply unit, and blocks communication between the control device and the power supply unit. Thereby, the operation of the power supply unit is prohibited, and the power supply unit does not function.

In addition, in the power supply device according to the first mode, the initial value of the cryptographic key and an identifying mark (ID) given a digital signature is desirably given also to a power generating device and a power consuming appliance (the power generating device and the power consuming appliance may hereinafter be referred to collectively as a "power generating device and the like") in advance.

When communication between the power generating device and the like and the control device is restored, the control device checks whether the power generating device and the like are the power generating device and the like when the communication was blocked. Specifically, the control device repeatedly obtains the cryptographic key updated on the basis of the transition function from the cryptographic key stored in the power generating device and the like when the power generating device and the like were removed from the power supply unit group, and when the updated cryptographic key coincides with the present cryptographic key, the control device can determine that the power generating device and the like are the power generating device and the like when the communication was blocked. Alternatively, the control device repeatedly obtains the cryptographic key in the past on the basis of an inverse function of the transition function from the cryptographic key stored in the power generating device and the like when the power generating device and the like were removed from the power supply unit group, and when the obtained cryptographic key coincides with the cryptographic key in the past which cryptographic key in the past is stored in the control device, the control device can determine that the power generating device and the like are a power generating device and the like removed from the power supply unit group. Alternatively, an identifying mark (for example a random number) generated by the control device when the communication was blocked may be stored in the storage device provided to the power generating device and the like. Thereby, it can be determined that the power generating device and the like are the power generating device and the like when the communication was blocked on the basis of such an identifying mark. Alternatively, a time when the communication was blocked may be stored in the storage device provided to the power generating device and the like and the control device. Thereby, it can be determined that the power generating device and the like are the power generating device and the like when the communication was blocked on the basis of such a stored time. Alternatively, the initial value of the cryptographic key and the identifying mark given the digital signature, the initial value of the cryptographic key and the identifying mark being given in advance, may be used. Alternatively, these methods may be combined as appropriate. When the power generating device and the like are the power generating device and the like when the communication was blocked, the cryptographic key is sent to the power generating device and the like. The cryptographic key is the newest (present) cryptographic key. The cryptographic key is stored in the storage device provided to the power generating device and the like. Thereby the incorporation of the power generating device and the like is completed.

In the power supply device according to the first mode, when an authorized power generating device and the like are connected to the control device by the communicating circuit, the control device checks whether the power generating device and the like are an authorized power generating device and the like. Specifically, as described above, the control device can determine that the power generating device and the like are an authorized power generating device and the like on the basis of the initial value of the cryptographic key and the identifying mark (ID) given the digital signature, the initial value of the cryptographic key and the identifying mark being given in advance. When the power generating device and the like do not have the initial value of the cryptographic key and the identifying mark given the digital signature, it is determined that the power generating device and the like are an unauthorized power generating device and the like. When the power generating device and the like are an authorized power generating device and the like, the control device sends the cryptographic key to the power generating device and the like. The cryptographic key is the newest (present) cryptographic key. The cryptographic key is stored in the storage device provided to the power generating device and the like. Thereby the incorporation of the power generating device and the like is completed. When the power generating device and the like are an unauthorized power generating device and the like, on the other hand, the control device does not send the cryptographic key to the power generating device and the like, and blocks communication between the control device and the power generating device and the like. Thereby, the operation of the power generating device and the like is prohibited, and the power generating device and the like do not function.

A personal computer can be cited as the control device having a display device and a selecting device in the power supply devices according to the second to fourth modes, the control device in the power supply device according to the first mode, or a part of the control device. The display device can be any display device. A pointing device and a keyboard can be cited as the selecting device. Incidentally, examples of the pointing device include a joystick, a pointing stick (trackpoint), a touch pad, a touch panel, a stylus pen, a data glove, a trackball, a graphics tablet, a mouse, a light pen, and a joy pad.

In the power supply device according to the second mode or a preferable form of the power supply device according to the third mode, the display device displays a state of power generation of the power generating device and a state of charge and discharge of each power supply unit. The control device and the power generating device as well as the control device and each power supply unit are connected to each other by the above-described communicating circuit, for example. Then, it suffices for the control device to receive the state of power generation of the power generating device which state is obtained by a power generating device control device provided in the power generating device on the basis of a well known method via the communicating circuit, and display the state of power generation of the power generating device on the display device. Similarly, it suffices for the control device to receive the states of charge and discharge of the power supply units which states are obtained by power supply unit control devices provided in the power supply units on the basis of a well known method via the communicating circuit, and display the states of charge and discharge of the power supply units on the display device. The control device selects a power supply unit on the basis of a selection from the selecting device. However, the selection of a power supply unit from the selecting device may be made by an operator. Alternatively, the operator inputs an instruction to start the selection of a power supply unit from the selecting device, and the control device orders the states of charge and discharge of the power supply units (for example arranges the states of charge and discharge of the power supply units in decreasing order of discharge time, in decreasing order of discharged power, or in increasing order of remaining amounts), considers the state of power generation of the power generating device, that is, determines the number of power supply units that can be charged by the power generating device, and selects a power supply unit. Then, in these cases, the control device establishes a power supply line between the selected power supply unit and the power generating device to supply power from the power generating device to the selected power supply unit and charge the power supply unit by a well known method under control of the power supply unit control device.

In the power supply device according to the third mode, the display device displays a state of power consumption of a power consuming appliance and a state of charge and discharge of each power supply unit. The control device and the power consuming appliance as well as the control device and each power supply unit are connected to each other by the above-described communicating circuit, for example. Then, it suffices for the control device to receive the power consumption state obtained by a power consuming appliance control device provided in the power consuming appliance on the basis of a well known method via the communicating circuit, and display the power consumption state on the display device. Similarly, it suffices for the control device to receive the states of charge and discharge of the power supply units which states are obtained by power supply unit control devices provided in the power supply units on the basis of a well known method via the communicating circuit, and display the states of charge and discharge of the power supply units on the display device. The control device selects a power supply unit on the basis of a selection from the selecting device. However, the selection of a power supply unit from the selecting device may be made by an operator. Alternatively, the operator inputs an instruction to start the selection of a power supply unit from the selecting device, and the control device orders the states of charge and discharge of the power supply units (for example arranges the states of charge and discharge of the power supply units in decreasing order of discharge time, in decreasing order of discharged power, or in increasing order of remaining amounts), considers the state of power consumption of the power consuming appliance, that is, determines the number of power supply units that can supply power to the power consuming appliance, and selects a power supply unit. Then, in these cases, the control device establishes a power supply line between the selected power supply unit and the power consuming appliance to supply power from the selected power supply unit to the power consuming appliance.

In the power supply device according to the fourth mode, the display device displays a state of charge and discharge of each power supply unit. The control device and each power supply unit are connected to each other by the above-described communicating circuit, for example. Then, it suffices for the control device to receive the states of charge and discharge of the power supply units which states are obtained by power supply unit control devices provided in the power supply units on the basis of a well known method via the communicating circuit, and display the states of charge and discharge of the power supply units on the display device. The control device selects power supply units on the basis of a selection from the selecting device. However, the selection of power supply units from the selecting device may be made by an operator. Alternatively, the operator inputs an instruction to start the selection of power supply units from the selecting device, and the control device orders the states of charge and discharge of the power supply units (for example arranges the states of charge and discharge of the power supply units in decreasing order of discharge time, in decreasing order of discharged power, or in increasing order of remaining amounts). It suffices for the control device to for example set a power supply unit having a large remaining amount as a selected power supply unit to output power and set a power supply unit having a small remaining amount as a selected power supply unit to receive (to be supplied with) power, and establish a power supply line between the selected power supply unit to output power and the selected power supply unit to receive (to be supplied with) power to transfer power from the selected power supply unit to output power to the selected power supply unit to receive (to be supplied with) power.

In a power supply unit in an embodiment, charge and discharge controlling device can take a form including an integrated circuit for charge and discharge control and a DC-to-DC converter. When the charge and discharge controlling device includes the DC-to-DC converter, the output voltage of the power supply unit can be made to be constant voltage, and output to the outside stably. Incidentally, the integrated circuit for charge and discharge control and the DC-to-DC converter themselves can be formed by a well known integrated circuit for charge and discharge control and a well known DC-to-DC converter.

The power supply unit in one embodiment including the above-described preferable forms can have a configuration further including:

(F) at least one information input section disposed in a casing and connected to the charge and discharge controlling device; and (G) at least one information output section disposed in the casing and connected to the charge and discharge controlling device. When such a configuration is employed, and the whole of a plurality of power supply units is connected to the control device by a communicating circuit, control of the plurality of power supply units by the control device, sending and receiving, exchanges and the like of information in the plurality of power supply units, checks of states of operation of the plurality of power supply units, and display of the states of operation of the plurality of power supply units, for example, are made possible. Incidentally, the power input section may double as the information input section, and the power output section may double as the information output section.

The power supply unit in one embodiment including the above-described preferable forms and configurations can take a form in which the power input section is formed by a USB terminal section and the power output section is formed by a USB terminal section fitted to the power input section formed by the USB terminal section. Alternatively, the power supply unit in one embodiment including the above-described preferable form including the configuration having at least one information input section and at least one information output section described above can take a form in which the power input section and the power output section are formed by a radio power transmission circuit. Concrete examples of the radio power transmission circuit (radio power transmission system) in this case include radio power transmission circuits of the various systems described above. However, the radio power transmission circuit is not limited to these examples.

The shape of the casing of the power supply unit in one embodiment including the various preferable forms and configurations described above is desirably a configuration having a shape such that a plurality of casings can be arranged without a space between the plurality of casings. Concrete examples of a sectional shape when the casing is sectioned in an imaginary plane orthogonal to the axis of the casing having the shape of a prism include: triangles including a regular triangular prism; quadrangles including a square, a rectangle, and a parallelogram; a regular hexagon; and arbitrary shapes enclosed by segments and curves. Incidentally, the shape of the casing when the sectional shape is a square or a rectangle can also be said to be a cube or a rectangular parallelepiped. It suffices to fabricate the casing from a plastic material, for example a thermoplastic resin, or specifically, for example: a polyolefin base resin such as a polyethylene resin, a polypropylene resin or the like; a polyamide base resin such as polyamide 6, polyamide 66, polyamide MXD6, or the like; a polyoxymethylene (polyacetal, POM) resin; a polyester base resin such as a polyethylene terephthalate (PET) resin, a polybutylene terephthalate (PBT) resin, or the like; a polyphenylene sulfide resin; a styrene base resin such as a polystyrene resin, an ABS resin, an AES resin, an AS resin, or the like; a methacrylic base resin; a polycarbonate resin; a modified polyphenylene ether (PPE) resin; a polysulfone resin; a polyethersulfone resin; a polyarylate resin; a polyetherimide resin; a polyamide-imide resin; a polyimide base resin; a polyether ketone resin; a polyether ether ketone resin; a polyester carbonate resin; or a liquid crystal polymer or the like. However, the casing is not limited to this.

Alternatively, the casing of the power supply unit in one embodiment including the various preferable forms and configurations described above desirably has the shape of a regular hexagonal prism. In this case, the power input section can be provided in an odd-numbered side face of the casing having the shape of the regular hexagonal prism, and the power output section can be provided in an even-numbered side face of the casing having the shape of the regular hexagonal prism. Incidentally, the power input section may be provided in all odd-numbered side faces of the casing having the shape of the regular hexagonal prism, or may be provided in a part of the side faces. Similarly, the power output section may be provided in all even-numbered side faces of the casing having the shape of the regular hexagonal prism, or may be provided in a part of the side faces.

Further, the power supply unit in one embodiment including the various preferable forms and configurations described above can have a configuration in which an input display device for displaying the presence or absence of power input, the input display device being connected to the charge and discharge controlling device, is disposed in the vicinity of the power input section, and an output display device for displaying the presence or absence of power output, the output display device being connected to the charge and discharge controlling device, is disposed in the vicinity of the power output section. In this case, the input display device and the output display device can have a configuration including a display section formed of a member transmitting light in the shape of an arrow and a light emitting element disposed on the inside of the display section. Further, the input display device and the output display device can be disposed in a top face of the casing.

In the power supply unit in one embodiment including the various preferable forms and configurations described above, a form in which a plurality of power supply units are combined with each other by connecting power input sections and power output sections of the power supply units adjacent to each other can be cited as a form of arrangement of the power supply units, and thereby a power supply unit group is formed. Incidentally, as described above, a minimum number of power supply units in the power supply unit group is two, and there is no particular upper limit to the number of power supply units. The plurality of power supply units may be combined with each other two-dimensionally to form the power supply unit group, or the plurality of power supply units may be combined with each other three-dimensionally or in a state of being laminated to thereby form the power supply unit group. Alternatively, the plurality of power supply units may be combined with each other two-dimensionally, and further combined with each other three-dimensionally (in a state of being laminated). The capacity and dimensions (size) of the power supply units forming the power supply unit group and the number, output voltage, capacity and the like of secondary battery cells forming the power supply units may be the same in the power supply units, or may be different between the power supply units.

First Embodiment

A first embodiment relates to a power supply device according to a first mode. FIG. 1A is a conceptual diagram of the power supply device according to the first embodiment. In addition, FIG. 3 shows a flow of operation in the power supply device according to the first embodiment.

The power supply device 100A according to the first embodiment includes:

(a) a power supply unit group 10 composed of a plurality of power supply units 11 and connected with a power consuming appliance 13; and (b) a control device 110 for controlling the power supply unit group 10.

The control device 110 and each of the power supply units 11 are connected to each other by a communicating circuit 113. The control device 110 is for example formed by a personal computer including a liquid crystal display as a display device 111 and including a keyboard and a mouse as a selecting device 112.

In this case, a commercial power supply 12 as a power supply in the power supply device 100A may be connected to one part of the power supply unit group 10, or may be connected to a plurality of parts of the power supply unit group 10. In addition, one or a plurality of power consuming appliances 13 may be connected to one part of the power supply unit group 10, or one or a plurality of power consuming appliances 13 may be connected to a plurality of parts of the power supply unit group 10. FIG. 1A shows a form in which the commercial power supply 12 is connected to one part of the power supply unit group 10, and a plurality of power consuming appliances 13 are connected to a plurality of parts of the power supply unit group 10. The power supply unit group 10 and the power consuming appliances 13 are connected to each other by using wiring 14. Alternatively, however, the power supply unit group 10 and the power consuming appliances 13 may be connected to each other on the basis of a radio power transmission system such as an electromagnetic induction system or a magnetic resonance system, for example. Incidentally, the wiring 14 for connecting the power supply unit group 10 to the power consuming appliances 13 is indicated by dotted lines, which represent a state in which the power supply unit group 10 and the power consuming appliances 13 are already connected to each other by the wiring 14 or a state in which the power supply unit group 10 and the power consuming appliances 13 will be connected to each other by the wiring 14 in the future. The same is also true in embodiments to be described in the following. In some cases, a power supply unit 11 and a power consuming appliance 13 may be integral with each other.

Incidentally, FIG. 1A shows only one system of the power supply unit group 10, the power supply units 11, and the power consuming appliances 13. However, there may be a plurality of systems. The control device 110 and each of the power supply units 11 share a cryptographic key to perform communication between the control device 110 and each of the power supply units 11. In this case, the cryptographic key (network key) is denoted by "nki," which represents an ith cryptographic key and a state of the cryptographic key having been updated i times. The initial value of the cryptographic key is denoted by nk0. A digital signature is performed by a secret key of a manufacturer and authorizer, and attached to the initial value nk0 of the cryptographic key and the individual IDs of the power supply units 11. This is to prevent the initial value of the cryptographic key from being illegally copied in an unauthorized product and misused. The control device 110 verifies the attached signature on the basis of a public key of the manufacturer and authorizer, and confirms that the power supply units 11 are authorized regular products. In the first embodiment, the cryptographic key nki is stored in a storage device provided to the control device 110 and a storage device provided to all devices included in the power supply device 100A and connected to the control device 110 by the communicating circuit 113.

The first embodiment uses ZigBee for the communicating circuit 113 for connecting the control device 110 to each of the power supply units 11. However, the communicating circuit 113 is not limited to this. The same is also true in embodiments to be described in the following. The control device 110 checks a state of connection to each of the power supply units 11 periodically, that is, at predetermined time intervals, and can easily detect detachment or the like of each of the power supply units 11. That is, the control device 110 detects that a power supply unit 11 is removed from the power supply unit group 10, and detects that a power supply unit 11 is returned to the power supply unit group. Specifically, for example, a physical and electric device such as a switch, for example, provided in a power supply unit 11 detects that the power supply unit 11 is physically removed (detached) from the power supply unit group 10, and this information is sent from the power supply unit 11 to the control device 110, whereby the control device 110 can detect that the power supply unit 11 is removed from the power supply unit group 10. Alternatively, a power supply unit 11 in the power supply unit group 10 sends information indicating that mutual communication between power supply units 11 is blocked, for example, to the control device 110, whereby the control device 110 can detect that a power supply unit 11 is removed from the power supply unit group 10. Alternatively, when communication between a power supply unit 11 and the control device 110 is blocked, the control device 110 can detect that the power supply unit 11 is removed from the power supply unit group 10.

The control device 110 and each of the power supply units 11 share the cryptographic key $nk_i$ to perform communication between the control device 110 and each of the power supply units 11. When a power supply unit is taken out to the outside or a power supply unit is replaced, the power supply unit 11 is removed from the power supply unit group 10. In the first embodiment, detecting that the power supply unit 11 is removed from the power supply unit group 10, the control device 110 updates the cryptographic key $nk_i$ to a cryptographic key $nk_{i+1}$. In updating the cryptographic key, the new (updated) cryptographic key $nk_{i+1}$ is generated from the present cryptographic key $nk_i$ on the basis of a predetermined transition function Ek. For example, $nk_1=Ek(nk_0)$ $nk_2=Ek(nk_1)$ $nk_{i+1}=Ek(nk_i)$ $nk_{i+2}=Ek(nk_{i+1})$ The transition function Ek is retained by the control device 110, and the cryptographic key is updated by the control device 110.

Thus, the updated new cryptographic key $nk_{i+1}$ is sent to each of the power supply units 11 connected to the control device 110 by the communicating circuit 113, and stored in the storage device provided to each of the power supply units 11.

When a power supply unit 11 is returned to the power supply unit group 10, or specifically, when the power supply unit 11 is physically incorporated into the power supply unit group 10, and the power supply unit 11 and the control device 110 are connected to each other by the communicating circuit 113 again, the control device 110 checks whether the power supply unit 11 is a power supply unit 11 removed from the power supply unit group 10.

Specifically, the control device 110 repeatedly obtains the cryptographic key updated on the basis of the transition function Ek from the cryptographic key $nk_j$ stored in the power supply unit 11 when the power supply unit 11 was removed from the power supply unit group 10, and when the updated cryptographic key coincides with the present cryptographic key $nk_{j+k}$, the control device 110 can determine that the power supply unit 11 is a power supply unit removed from the power supply unit group 10. Alternatively, the control device repeatedly obtains the cryptographic key in the past on the basis of an inverse function $Ek^{-1}$ of the transition function from the cryptographic key stored in the power supply unit 11 when the power supply unit 11 was removed from the power supply unit group 10, and when the obtained cryptographic key coincides with the cryptographic key in the past which cryptographic key in the past is stored in the control device 110, the control device 110 can determine that the power supply unit 11 is a power supply unit removed from the power supply unit group 10. Alternatively, an identifying mark (for example a random number) generated by the control device 110 when a power supply unit 11 is removed from the power supply unit group 10 may be stored in the power supply unit 11 and the control device 110. Thereby, it can be determined that the power supply unit 11 is a power supply unit removed from the power supply unit group 10 on the basis of such an identifying mark. Alternatively, a time when a power supply unit 11 is removed from the power supply unit group 10 may be stored in the power supply unit 11 and the control device 110. Thereby, it can be determined that the power supply unit 11 is a power supply unit removed from the power supply unit group 10 on the basis of such a stored time. Alternatively, the identifying mark and the initial value $nk_0$ of the cryptographic key given a digital signature, the identifying mark and the initial value $nk_0$ of the cryptographic key being given in advance, may be used. Alternatively, these methods may be combined as appropriate.

When the power supply unit 11 is a power supply unit removed from the power supply unit group 10, the cryptographic key $nk_{j+k}$ is sent to the power supply unit 11. The power supply unit 11 stores the cryptographic key $nk_{j+k}$ in the storage device of the power supply unit 11. Thereby the incorporation of the power supply unit 11 into the power supply unit group 10 is completed.

When a power supply unit 11 is returned to the power supply unit group 10, the control device 110 checks whether the power supply unit 11 is a power supply unit removed from the power supply unit group 10, as described above. When the power supply unit 11 is not a power supply unit removed from the power supply unit group 10, and the power supply unit 11 has been incorporated into another power supply unit group once, that is, for example when the control device 110 has repeatedly obtained the cryptographic key a predetermined number of times on the basis of the transition function Ek from the cryptographic key $nk'_j$ stored in the power supply unit 11, but the cryptographic key does not coincide with the present cryptographic key $nk_{j+k}$, the control device 110 determines that the power supply unit 11 is not a power supply unit removed from the power supply unit group 10. Then, the control device 110 does not send the cryptographic key to the power supply unit, and blocks communication between the control device 110 and the power supply unit. Thereby, the operation of the power supply unit is prohibited, and the power supply unit does not function.

Suppose that a new power supply unit 11 is incorporated into the power supply unit group 10 in the first embodiment. The newly incorporated power supply unit 11 is not a power supply unit removed from the power supply unit group 10 but is a power supply unit that has not been incorporated into the power supply unit group 10 once. When the power supply unit 11 is an authorized power supply unit, an identifying mark and the initial value $nk_0$ of the cryptographic key given a digital signature, the identifying mark and the initial value $nk_0$ of the cryptographic key being given in advance, are stored in the power supply unit 11. When the power supply unit 11 is incorporated into the power supply unit group 10, the control device 110 checks whether the power supply unit 11 is an authorized power supply unit. Specifically, the control device 110 determines that the power supply unit 11 is an authorized power supply unit on the basis of the identifying mark and the initial value $nk_0$ of the cryptographic key given the digital signature, the identifying mark and the initial value $nk_0$ of the cryptographic key being given in advance. When the power supply unit is an authorized power supply unit, the control device 110 sends the cryptographic key $nk_i$ to the power supply unit, and the cryptographic key $nk_i$ is stored in the power supply unit. Thus, the incorporation of the new power supply unit into the power supply unit group is completed.

When the power supply unit does not have the identifying mark and the initial value $nk_0$ of the cryptographic key given the digital signature, on the other hand, it is determined that the power supply unit is an unauthorized power supply unit. Then, in this case, the control device 110 does not send the cryptographic key to the power supply unit, and blocks communication between the control device 110 and the power supply unit. Thereby, the operation of the power supply unit is prohibited, and the power supply unit does not function.

Thus, in the power supply device 100A according to the first embodiment, when a power supply unit 11 is removed from the power supply unit group 10, the control device 110 updates the cryptographic key $nk_i$ shared to perform communication between the control device 110 and each of the power supply units 11 to a cryptographic key $nk_{i+1}$ on the basis of the transition function Ek. Thus, even in a case where the cryptographic key $nk_i$ is extracted by analyzing a power supply unit 11 removed from the power supply unit group 10, and the cryptographic key $nk_i$ is incorporated into another power supply unit, or in a case where an attempt is made to incorporate a different power supply unit into the power supply unit group 10, the cryptographic key does not coincide when an attempt is made to incorporate these power supply units into the power supply unit group 10. Thereby, the operation of these power supply unit is prohibited, and these power supply unit do not function. Thus, the power supply device 100A can be provided with high levels of security and reliability.

Second Embodiment

Figure 1B:
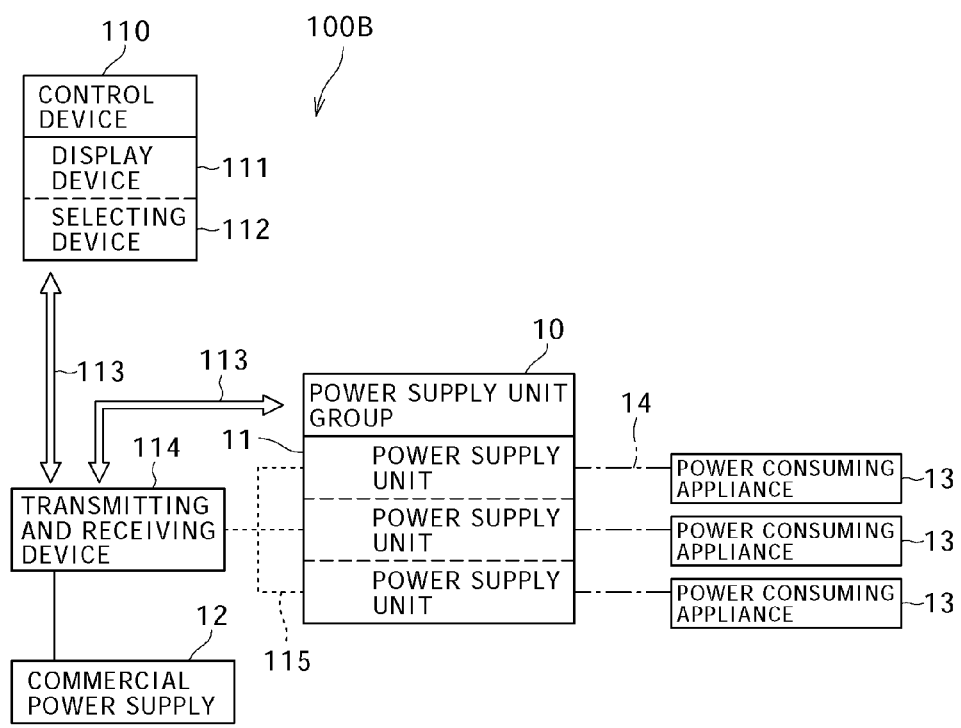

A second embodiment is a modification of the first embodiment. FIG. 1B is a conceptual diagram of a power supply device according to the second embodiment.

In the power supply device 100B according to the second embodiment, a control device 110 and power supply units 11 are connected to each other by a communicating circuit 113 via a transmitting and receiving device 114, and power is supplied to each of the power supply units 11 by a radio power transmission circuit 115 of an electromagnetic induction system which circuit is included in the transmitting and receiving device 114. That is, the transmitting and receiving device 114 also functions as a so-called battery stand. The transmitting and receiving device 114 is supplied with power from a commercial power supply 12. The control device 110 detects via the transmitting and receiving device 114 that a power supply unit 11 is removed from a power supply unit group 10 and that a power supply unit 11 is returned to the power supply unit group.

Incidentally, FIG. 1B shows only one system of the transmitting and receiving device 114, the radio power transmission circuit 115, the power supply unit group 10, the power supply units 11, and power consuming appliances 13. However, there may be a plurality of systems.

Except for the above points, the configuration, structure, cryptographic key processing and the like of the power supply device 100B according to the second embodiment can be made similar to the configuration, structure, cryptographic key processing and the like of the power supply device 100A according to the first embodiment, and therefore detailed description thereof will be omitted.

Third Embodiment

Figure 2A:
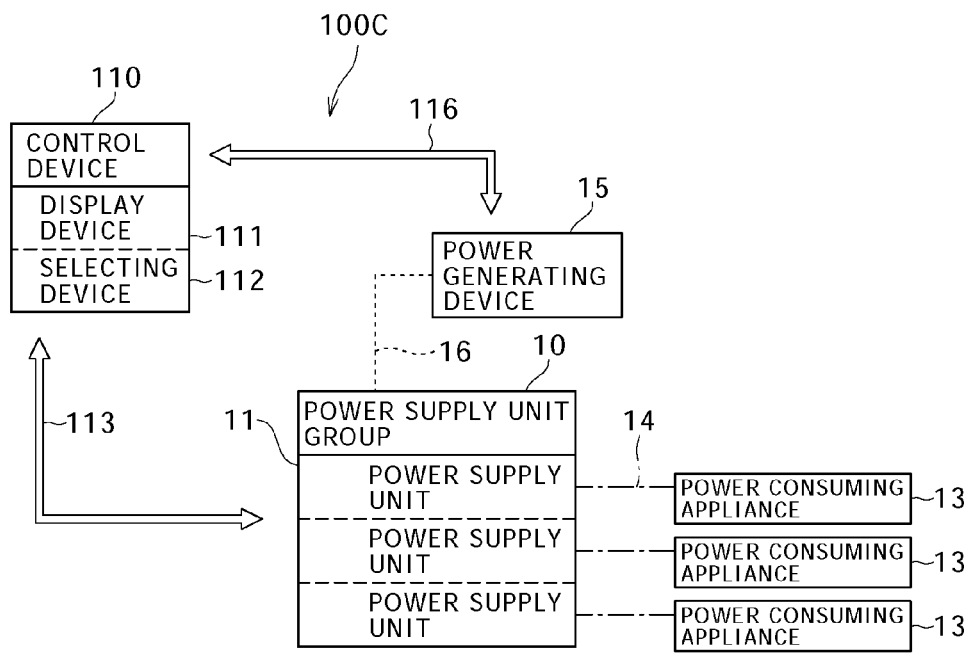
FIGS. 2A and 2B are conceptual diagrams of power supply devices according to a third embodiment and a fourth embodiment.

A third embodiment is also a modification of the first embodiment, but relates to a power supply device according to a 1A mode. FIG. 2A is a conceptual diagram of a power supply device according to the third embodiment.

In the third embodiment, the power supply device 100C further includes a power generating device 15, and a control device 110 and the power generating device 15 are connected to each other by a communicating circuit 116. The third embodiment uses ZigBee for the communicating circuit 116 for connecting the control device 110 to the power generating device 15. However, the communicating circuit 116 is not limited to this. In addition, the power generating device 15 is specifically formed by a solar battery. In this case, the power generating device 15 may be connected to one part of a power supply unit group 10, or may be connected to a plurality of parts of the power supply unit group 10. In addition, the power generating device 15 is not limited to one power generating device, but may be a plurality of power generating devices. FIG. 2A shows a form in which one power generating device 15 is connected to one part of the power supply unit group 10, and a plurality of power consuming appliances 13 are connected to a plurality of parts of the power supply unit group 10. In addition, an identifying mark and the initial value $nk_0$ of a cryptographic key given a digital signature is given to the power generating device 15 in advance. The power supply unit group 10 and the power generating device 15 are connected to each other by using wiring 16. Alternatively, however, the power supply unit group 10 and the power generating device 15 may be connected to each other on the basis of a radio power transmission system such as an electromagnetic induction system or a magnetic resonance system, for example.

When communication between the power generating device 15 and the control device 110 is blocked, or specifically, when the power generating device 15 is removed or when the operation of the power generating device 15 is stopped, the control device 110 updates a present cryptographic key $nk_i$ to a new cryptographic key $nk_{i+1}$. Then, when the communication between the power generating device 15 and the control device 110 is restored, the control device 110 checks whether the power generating device 15 is the power generating device when the communication between the power generating device 15 and the control device 110 was blocked.

Specifically, the control device 110 repeatedly obtains the cryptographic key updated on the basis of the transition function Ek from the cryptographic key $nk_j$ stored in the power generating device 15 when the power generating device 15 was removed from the power supply unit group 10, and when the updated cryptographic key coincides with the present cryptographic key $nk_{j+k}$, the control device 110 can determine that the power generating device 15 is the power generating device 15 when the communication was blocked. Alternatively, the control device repeatedly obtains the cryptographic key in the past on the basis of an inverse function $Ek^{-1}$ of the transition function from the cryptographic key stored in the power generating device 15 when the power generating device 15 was removed from the power supply unit group, and when the obtained cryptographic key coincides with the cryptographic key in the past which cryptographic key in the past is stored in the control device, the control device 110 can determine that the power generating device 15 is the power generating device 15 removed from the power supply unit group. Alternatively, an identifying mark (for example a random number) generated by the control device 110 when the communication was blocked may be stored in the storage device provided to the power generating device 15. Thereby, it can be determined that the power generating device 15 is the power generating device 15 when the communication was blocked on the basis of such an identifying mark. Alternatively, a time when the communication was blocked may be stored in the storage device provided to the power generating device 15 and the control device 110. Thereby, it can be determined that the power generating device 15 is the power generating device 15 when the communication was blocked on the basis of such a stored time. Alternatively, the identifying mark and the initial value $nk_0$ of the cryptographic key given the digital signature, the identifying mark and the initial value $nk_0$ of the cryptographic key being given in advance, may be used. Alternatively, these methods may be combined as appropriate.

When the power generating device 15 is the power generating device 15 when the communication between the power generating device 15 and the control device 110 was blocked, the cryptographic key $nk_{j+k}$ is sent to the power generating device. The cryptographic key $nk_{j+k}$ is stored in the storage device provided to the power generating device 15. Thereby the incorporation of the power generating device 15 into the power supply unit group 10 is completed.

The above operation can be made essentially similar to the cryptographic key processing method described in the first embodiment, and therefore detailed description thereof will be omitted.

In addition, when a power generating device that is not the power generating device when the communication between the power generating device 15 and the control device 110 was blocked but is an authorized power generating device is connected to the control device 110 by the communicating circuit 116, the control device 110 checks whether the power generating device is an authorized power generating device. When the power generating device is an authorized power generating device, the control device 110 sends the cryptographic key to the power generating device. Such an operation can also be made similar to the operation described in the first embodiment, and therefore detailed description thereof will be omitted. Further, when an unauthorized power generating device is connected to the control device 110 by the communicating circuit 116, the control device 110 checks whether the power generating device is an authorized power generating device. When the power generating device is an unauthorized power generating device, the control device 110 does not send the cryptographic key to the power generating device, and blocks communication between the control device 110 and the power generating device. Such an operation can also be made similar to the operation described in the first embodiment, and therefore detailed description thereof will be omitted. Incidentally, the power supply device according to the third embodiment and the power supply device according to the second embodiment may be combined with each other.

Fourth Embodiment

Figure 2B:
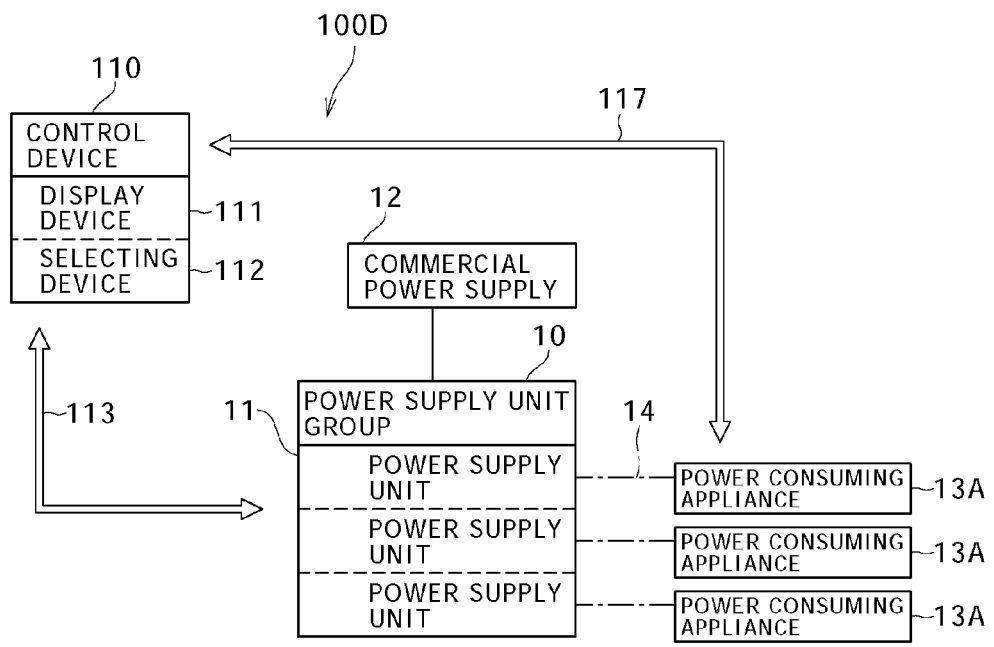

A fourth embodiment is also a modification of the first embodiment, but relates to a power supply device according to a 1B mode. FIG. 2B is a conceptual diagram of a power supply device according to the fourth embodiment.

In the power supply device 100D according to the fourth embodiment, a control device 110 and power consuming appliances 13A are connected to each other by a communicating circuit 117. The fourth embodiment also uses ZigBee for the communicating circuit 117 for connecting the control device 110 to the power consuming appliances 13A. However, the communicating circuit 117 is not limited to this. The power consuming appliances 13A may be connected to one part of a power supply unit group 10, or may be connected to a plurality of parts of the power supply unit group 10. An identifying mark and the initial value $nk_0$ of a cryptographic key given a digital signature is given also to the power consuming appliances 13A in advance. The power supply unit group 10 and the power consuming appliances 13A are connected to each other by using wiring 14, as in the first embodiment. Alternatively, however, the power supply unit group 10 and the power consuming appliances 13A may be connected to each other on the basis of a radio power transmission system such as an electromagnetic induction system or a magnetic resonance system, for example.

When communication between a power consuming appliance 13A and the control device 110 is blocked, or specifically, when a power consuming appliance 13A is removed or when the operation of a power consuming appliance 13A is stopped, the control device 110 updates a present cryptographic key $nk_i$ to a new cryptographic key $nk_{i+1}$. Then, when the communication between the power consuming appliance 13A and the control device 110 is restored, the control device 110 checks whether the power consuming appliance 13A is the power consuming appliance when the communication between the power consuming appliance 13A and the control device 110 was blocked.

Specifically, the control device 110 repeatedly obtains the cryptographic key updated on the basis of the transition function Ek from the cryptographic key $nk_j$ stored in the power consuming appliance 13A when the power consuming appliance 13A was removed from the power supply unit group 10, and when the updated cryptographic key coincides with the present cryptographic key $nk_{j+k}$, the control device 110 can determine that the power consuming appliance 13A is the power consuming appliance 13A when the communication was blocked. Alternatively, the control device repeatedly obtains the cryptographic key in the past on the basis of an inverse function $Ek^{-1}$ of the transition function from the cryptographic key stored in the power consuming appliance 13A when the power consuming appliance 13A was removed from the power supply unit group, and when the obtained cryptographic key coincides with the cryptographic key in the past which cryptographic key in the past is stored in the control device, the control device 110 can determine that the power consuming appliance 13A is the power consuming appliance removed from the power supply unit group. Alternatively, an identifying mark (for example a random number) generated by the control device 110 when the communication was blocked may be stored in the storage device provided to the power consuming appliance 13A. Thereby, it can be determined that the power consuming appliance 13A is the power consuming appliance 13A when the communication was blocked on the basis of such an identifying mark. Alternatively, a time when the communication was blocked may be stored in the storage device provided to the power consuming appliance 13A and the control device 110. Thereby, it can be determined that the power consuming appliance 13A is the power consuming appliance 13A when the communication was blocked on the basis of such a stored time. Alternatively, it can be determined that the power consuming appliance 13A is the power consuming appliance 13A when the communication was blocked from the identifying mark and the initial value $nk_0$ of the cryptographic key given the digital signature, the identifying mark and the initial value $nk_0$ of the cryptographic key being given in advance. Alternatively, these methods may be combined as appropriate.

When the power consuming appliance 13A is the power consuming appliance when the communication between the power consuming appliance 13A and the control device 110 was blocked, the cryptographic key $nk_{j+k}$ is sent to the power consuming appliance. The cryptographic key $nk_{j+k}$ is stored in the storage device provided to the power consuming appliance 13A. Thereby the incorporation of the power consuming appliance 13A into the power supply unit group 10 is completed.

The above operation can be made essentially similar to the cryptographic key processing method described in the first embodiment, and therefore detailed description thereof will be omitted.

In addition, when a power consuming appliance that is not the power consuming appliance when the communication between the power consuming appliance 13A and the control device 110 was blocked but is an authorized power consuming appliance is connected to the control device 110 by the communicating circuit 117, the control device 110 checks whether the power consuming appliance is an authorized power consuming appliance. When the power consuming appliance is an authorized power consuming appliance, the control device 110 sends the cryptographic key to the power consuming appliance. Such an operation can also be made similar to the operation described in the first embodiment, and therefore detailed description thereof will be omitted. Further, when an unauthorized power consuming appliance is connected to the control device 110 by the communicating circuit 117, the control device 110 checks whether the power consuming appliance is an authorized power consuming appliance. When the power consuming appliance is an unauthorized power consuming appliance, the control device 110 does not send the cryptographic key to the power consuming appliance, and blocks communication between the control device 110 and the power consuming appliance. Such an operation can also be made similar to the operation described in the first embodiment, and therefore detailed description thereof will be omitted.

Incidentally, the power supply device according to the fourth embodiment and the power supply device according to the second embodiment may be combined with each other. The power supply device according to the fourth embodiment and the power supply device according to the third embodiment may be combined with each other. The power supply device according to the fourth embodiment, the power supply device according to the first embodiment, and the power supply device according to the third embodiment may be combined with each other. The power supply device according to the fourth embodiment, the power supply device according to the second embodiment, and the power supply device according to the third embodiment may be combined with each other.

Fifth Embodiment

Figure 4:
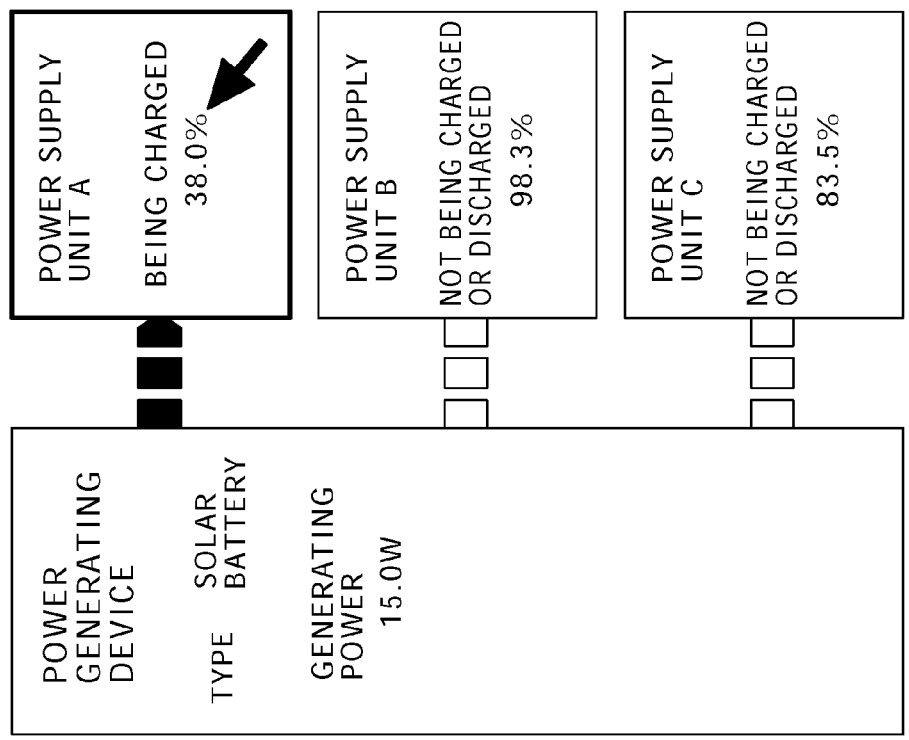
FIG. 4 is a diagram schematically showing an example of a screen of a display device in a control device forming a power supply device according to a fifth embodiment.

A fifth embodiment relates to a power supply device according to a second mode. FIG. 4 schematically shows an example of a screen of a display device 111 in a control device 110 forming a power supply device 100C according to the fifth embodiment.

As with the power supply device 100C according to the third embodiment, the power supply device 100C according to the fifth embodiment includes:

(a) a power supply unit group 10 composed of a plurality of power supply units 11 and connected to a power generating device 15; and (b) a control device 110 for controlling the power supply unit group 10, the control device 110 having a display device 111 and a selecting device 112.

In the power supply device 100C according to the fifth embodiment, the control device 110 and the power generating device 15 as well as the control device 110 and each of the power supply units 11 are connected to each other by a communicating circuits 116 and 113. The display device 111 displays a state of power generation of the power generating device 15 and a state of charge and discharge of each of the power supply units 11. Specifically, the control device 110 receives the state of power generation of the power generating device which state is obtained by a power generating device control device (not shown) provided in the power generating device 15 on the basis of a well known method via the communicating circuit 116, and displays the state of power generation of the power generating device on the display device 111. Similarly, the control device 110 receives the states of charge and discharge of the power supply units 11 which states are obtained by power supply unit control devices (not shown) provided in the power supply units 11 on the basis of a well known method via the communicating circuit 113, and displays the states of charge and discharge of the power supply units on the display device 111.

In the fifth embodiment, the control device 110 selects a power supply unit 11 on the basis of a selection from the selecting device 112, and supplies power from the power generating device 15 to the selected power supply unit 11 to charge the power supply unit 11. Specifically, while the control device 110 selects a power supply unit 11 on the basis of a selection from the selecting device 112, the selection of a power supply unit 11 from the selecting device 112 may be made by an operator. Alternatively, the operator inputs an instruction to start the selection of a power supply unit 11 from the selecting device 112. Then, the control device 110 orders the states of charge and discharge of the power supply units 11. Specifically, the control device 110 for example arranges the states of charge and discharge of the power supply units in decreasing order of discharge time, in decreasing order of discharged power, or in increasing order of remaining amounts. The control device 110 considers the state of power generation of the power generating device 15, or specifically, determines the number of power supply units 11 that can be charged by the power generating device 15, and selects a power supply unit 11. Then, the control device 110 establishes a power supply line between the selected power supply unit 11 and the power generating device 15, or specifically, establishes conduction between the selected power supply unit 11 and the power generating device 15 by controlling a switch group (not shown) provided to the power supply unit group 10, to supply power from the power generating device 15 to the selected power supply unit 11 and charge the power supply unit 11 by a well known method under control of the power supply unit control device.

In the power supply device 100C according to the fifth embodiment, the display device 111 displays a state of power generation of the power generating device 15 and a state of charge and discharge of each of the power supply units 11, and the control device 110 selects a power supply unit 11 on the basis of a selection from the selecting device 112. Therefore, a power supply unit 11 that needs charging can be selected easily depending on the state of power generation of the power generating device 15 and the states of charge and discharge of the power supply units 11.

Incidentally, the power supply device according to the fifth embodiment and the power supply device according to the second embodiment may be combined with each other. The power supply device according to the fifth embodiment and the power supply device according to the third embodiment may be combined with each other. The power supply device according to the fifth embodiment and the power supply device according to the fourth embodiment may be combined with each other. The power supply device according to the fifth embodiment, the power supply device according to the first embodiment, and the power supply device according to the third embodiment may be combined with each other. The power supply device according to the fifth embodiment, the power supply device according to the first embodiment, and the power supply device according to the fourth embodiment may be combined with each other. The power supply device according to the fifth embodiment, the power supply device according to the second embodiment, and the power supply device according to the third embodiment may be combined with each other. The power supply device according to the fifth embodiment, the power supply device according to the second embodiment, and the power supply device according to the fourth embodiment may be combined with each other. The power supply device according to the fifth embodiment, the power supply device according to the third embodiment, and the power supply device according to the fourth embodiment may be combined with each other. The power supply device according to the fifth embodiment, the power supply device according to the first embodiment, the power supply device according to the third embodiment, and the power supply device according to the fourth embodiment may be combined with each other. The power supply device according to the fifth embodiment, the power supply device according to the second embodiment, the power supply device according to the third embodiment, and the power supply device according to the fourth embodiment may be combined with each other.

Sixth Embodiment

Figure 5:
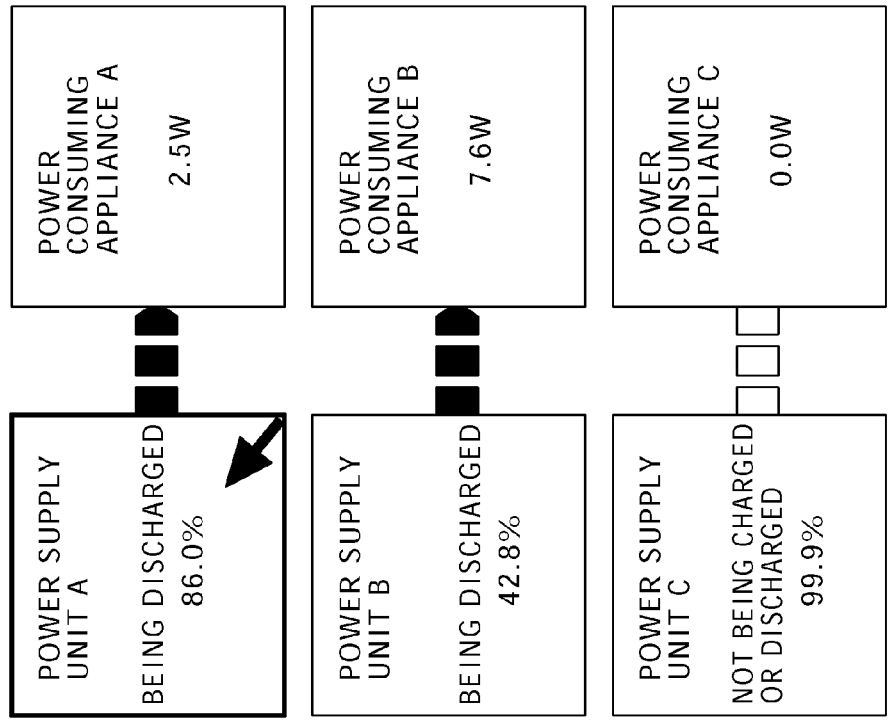
FIG. 5 is a diagram schematically showing an example of a screen of a display device in a control device forming a power supply device according to a sixth embodiment.

A sixth embodiment relates to a power supply device according to a third mode. FIG. 5 schematically shows an example of a screen of a display device 111 in a control device 110 forming a power supply device 100D according to the sixth embodiment.

As with the power supply device 100D according to the fourth embodiment, the power supply device 100D according to the sixth embodiment includes:

(a) a power supply unit group 10 composed of a plurality of power supply units 11 and connected with power consuming appliances 13A; and (b) a control device 110 for controlling the power supply unit group 10, the control device 110 having a display device 111 and a selecting device 112.

In the power supply device 100D according to the sixth embodiment, the control device 110 and each of the power supply units 11 as well as the control device 110 and the power consuming appliances 13A are connected to each other by communicating circuits 113 and 117. The display device 111 displays states of power consumption of the power consuming appliances 13A and a state of charge and discharge of each of the power supply units 11. Specifically, the control device 110 receives the power consumption states obtained by power consuming appliance control devices (not shown) provided in the power consuming appliances 13A on the basis of a well known method via the communicating circuit 117, and displays the power consumption states on the display device 111. Similarly, the control device 110 receives the states of charge and discharge of the power supply units 11 which states are obtained by power supply unit control devices (not shown) provided in the power supply units 11 on the basis of a well known method via the communicating circuit 113, and displays the states of charge and discharge of the power supply units 11 on the display device 111.

In the sixth embodiment, the control device 110 selects a power supply unit 11 on the basis of a selection from the selecting device 112, and supplies power from the selected power supply unit 11 to a power consuming appliance 13A. Specifically, the selection of a power supply unit 11 from the selecting device 112 may be made by an operator. Alternatively, the operator inputs an instruction to start the selection of a power supply unit 11 from the selecting device 112. Then, the control device 110 orders the states of charge and discharge of the power supply units 11. Specifically, the control device 110 for example arranges the states of charge and discharge of the power supply units in decreasing order of discharge time, in decreasing order of discharged power, or in increasing order of remaining amounts. The control device 110 considers the state of power consumption of a power consuming appliance 13A, or specifically, determines the number of power supply units 11 that can supply power to the power consuming appliance 13A, and selects a power supply unit. Then, the control device 110 establishes a power supply line between the selected power supply unit 11 and the power consuming appliance 13A, or specifically, establishes conduction between the selected power supply unit 11 and the power consuming appliance 13A by controlling a switch group (not shown) provided to the power supply unit group 10, to supply power from the selected power supply unit 11 to the power consuming appliance 13A.

In the power supply device 100D according to the sixth embodiment, the display device 111 displays states of power consumption of the power consuming appliances 13A and a state of charge and discharge of each of the power supply units 11, and the control device 110 selects a power supply unit 11 on the basis of a selection from the selecting device 112. Therefore, a power supply unit 11 to be used can be selected easily depending on the states of power consumption of the power consuming appliances 13A connected to the power supply units 11 and the states of charge and discharge of the power supply units 11.

Incidentally, the power supply device according to the sixth embodiment and the power supply device described in the fifth embodiment can be combined with each other. Specifically, the power supply device according to the sixth embodiment further includes a power generating device 15 connected to the power supply unit group 10. The display device 111 displays a state of power generation of the power generating device 15. The control device 110 selects a power supply unit 11 on the basis of a selection from the selecting device 112. Power is supplied from the power generating device 15 to the selected power supply unit 11 to charge the power supply unit 11.

Alternatively, the power supply device according to the sixth embodiment and the power supply device according to the second embodiment may be combined with each other. The power supply device according to the sixth embodiment and the power supply device according to the third embodiment may be combined with each other. The power supply device according to the sixth embodiment and the power supply device according to the fourth embodiment may be combined with each other. The power supply device according to the sixth embodiment, the power supply device according to the first embodiment, and the power supply device according to the third embodiment may be combined with each other. The power supply device according to the sixth embodiment, the power supply device according to the first embodiment, and the power supply device according to the fourth embodiment may be combined with each other. The power supply device according to the sixth embodiment, the power supply device according to the first embodiment, and the power supply device according to the fifth embodiment may be combined with each other. The power supply device according to the sixth embodiment, the power supply device according to the second embodiment, and the power supply device according to the third embodiment may be combined with each other. The power supply device according to the sixth embodiment, the power supply device according to the second embodiment, and the power supply device according to the fourth embodiment may be combined with each other. The power supply device according to the sixth embodiment, the power supply device according to the second embodiment, and the power supply device according to the fifth embodiment may be combined with each other. The power supply device according to the sixth embodiment, the power supply device according to the third embodiment, and the power supply device according to the fourth embodiment may be combined with each other. The power supply device according to the sixth embodiment, the power supply device according to the third embodiment, and the power supply device according to the fifth embodiment may be combined with each other. The power supply device according to the sixth embodiment, the power supply device according to the fourth embodiment, and the power supply device according to the fifth embodiment may be combined with each other. The power supply device according to the sixth embodiment, the power supply device according to the first embodiment, the power supply device according to the third embodiment, and the power supply device according to the fourth embodiment may be combined with each other. The power supply device according to the sixth embodiment, the power supply device according to the first embodiment, the power supply device according to the third embodiment, and the power supply device according to the fifth embodiment may be combined with each other. The power supply device according to the sixth embodiment, the power supply device according to the first embodiment, the power supply device according to the fourth embodiment, and the power supply device according to the fifth embodiment may be combined with each other. The power supply device according to the sixth embodiment, the power supply device according to the second embodiment, the power supply device according to the third embodiment, and the power supply device according to the fourth embodiment may be combined with each other. The power supply device according to the sixth embodiment, the power supply device according to the second embodiment, the power supply device according to the third embodiment, and the power supply device according to the fifth embodiment may be combined with each other. The power supply device according to the sixth embodiment, the power supply device according to the second embodiment, the power supply device according to the fourth embodiment, and the power supply device according to the fifth embodiment may be combined with each other. The power supply device according to the sixth embodiment, the power supply device according to the third embodiment, the power supply device according to the fourth embodiment, and the power supply device according to the fifth embodiment may be combined with each other. The power supply device according to the sixth embodiment, the power supply device according to the first embodiment, the power supply device according to the third embodiment, the power supply device according to the fourth embodiment, and the power supply device according to the fifth embodiment may be combined with each other. The power supply device according to the sixth embodiment, the power supply device according to the second embodiment, the power supply device according to the third embodiment, the power supply device according to the fourth embodiment, and the power supply device according to the fifth embodiment may be combined with each other.

Seventh Embodiment

Figure 6:
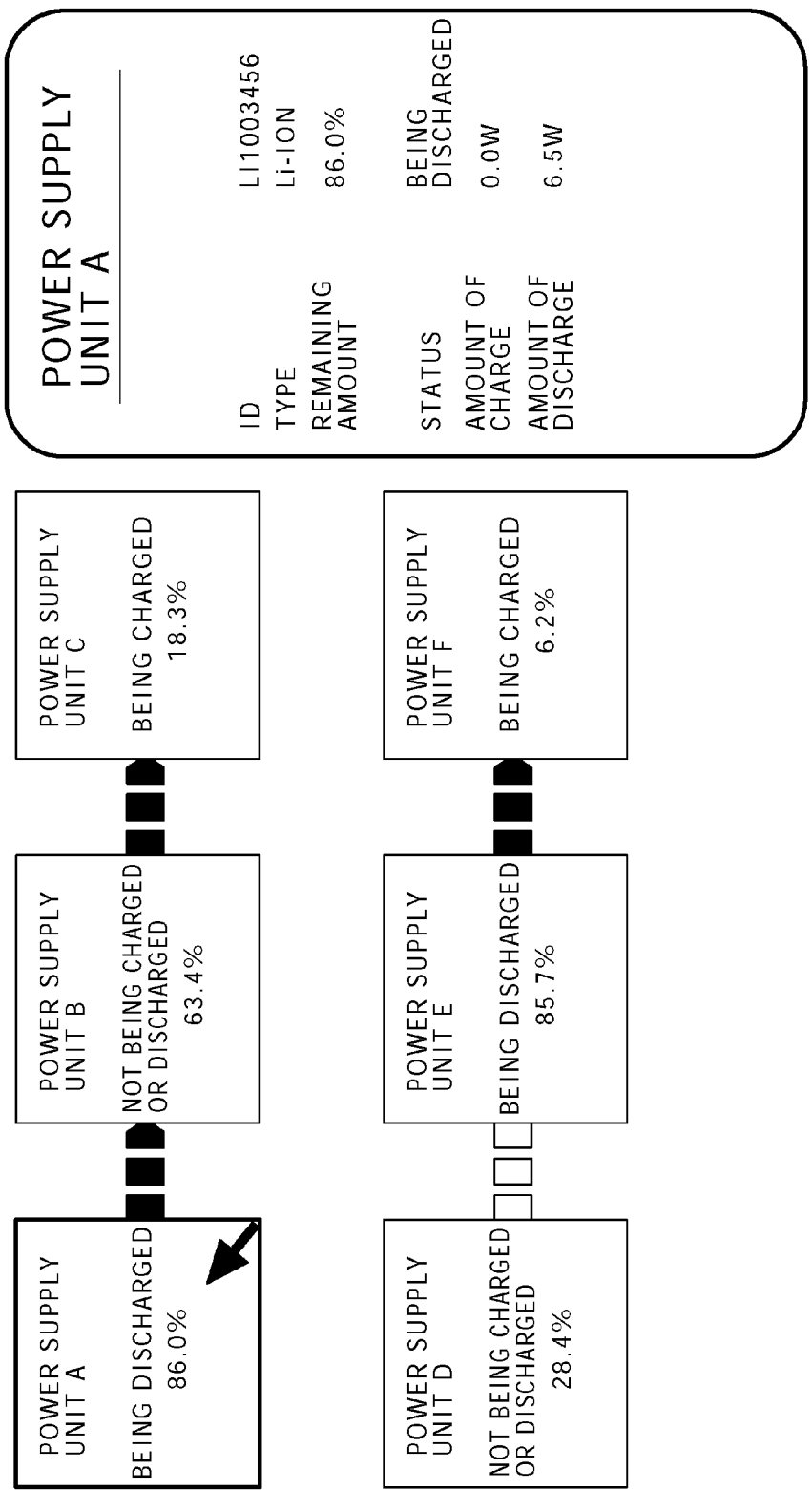
FIG. 6 is a diagram schematically showing an example of a screen of a display device in a control device forming a power supply device according to a seventh embodiment.

A seventh embodiment relates to a power supply device according to a fourth mode. FIG. 6 schematically shows an example of a screen of a display device 111 in a control device 110 forming a power supply device 100A according to the seventh embodiment.

As with the power supply device 100A according to the first embodiment, the power supply device 100A according to the seventh embodiment includes:

(a) a power supply unit group 10 composed of a plurality of power supply units 11; and (b) a control device 110 for controlling the power supply unit group 10, the control device 110 having a display device 111 and a selecting device 112.

In the power supply device 100A according to the seventh embodiment, the control device 110 and each of the power supply units 11 are connected to each other by a communicating circuit 113. The display device 111 displays a state of charge and discharge of each of the power supply units 11. Specifically, the control device 110 receives the states of charge and discharge of the power supply units 11 which states are obtained by power supply unit control devices (not shown) provided in the power supply units 11 on the basis of a well known method via the communicating circuit 113, and displays the states of charge and discharge of the power supply units 11 on the display device 111.

In the seventh embodiment, the control device 110 selects a power supply unit to output power and a power supply unit to receive (be supplied with) power on the basis of a selection from the selecting device 112, and makes power transferred from the selected power supply unit to output power to the selected power supply unit to receive (be supplied with) power. Specifically, the control device 110 receives the states of charge and discharge of the power supply units 11 which states are obtained by power supply unit control devices (not shown) provided in the power supply units 11 on the basis of a well known method via the communicating circuit 113, and displays the states of charge and discharge of the power supply units 11 on the display device 111. Then, the selection of a power supply unit 11 from the selecting device 112 may be made by an operator. Alternatively, the operator inputs an instruction to start the selection of a power supply unit 11 from the selecting device 112. Then, the control device 110 orders the states of charge and discharge of the power supply units 11. Specifically, the control device 110 for example arranges the states of charge and discharge of the power supply units in decreasing order of discharge time, in decreasing order of discharged power, or in increasing order of remaining amounts. The control device 110 for example sets a power supply unit having a large remaining amount as the selected power supply unit to output power and a power supply unit having a small remaining amount as the selected power supply unit to receive (be supplied with) power, establishes a power supply line between the selected power supply unit to output power and the selected power supply unit to receive (be supplied with) power, and makes power transferred from the selected power supply unit to output power to the selected power supply unit to receive (be supplied with) power. At this time, none of the power supply units 11 are supplied with power from the outside.

In the power supply device 100A according to the seventh embodiment, the display device 111 displays the state of charge and discharge of each of the power supply units 11, and the control device 110 selects a power supply unit to output power and a power supply unit to receive (be supplied with) power on the basis of a selection from the selecting device 112. Therefore, a power supply unit to which to transfer power to achieve averaging can be selected easily depending on the states of charge and discharge of the power supply units 11.

The power supply device according to the seventh embodiment and the power supply device according to the fifth embodiment can be combined with each other. The power supply device according to the seventh embodiment and the power supply device according to the sixth embodiment can be combined with each other. The power supply device according to the seventh embodiment, the power supply device according to the fifth embodiment, and the power supply device according to the sixth embodiment can be combined with each other. Further, the power supply device according to the seventh embodiment and power supply devices formed by the above combinations can be combined with the power supply devices described in the first to fourth embodiments as appropriate. Incidentally, when a combination of the power supply device according to the first embodiment and the power supply device according to the second embodiment is excluded, there are six combinations of the power supply device according to the seventh embodiment and one kind of power supply device among the power supply devices according to the first to sixth embodiments, there are 14 combinations of the power supply device according to the seventh embodiment and two kinds of power supply devices among the power supply devices according to the first to sixth embodiments, there are 16 combinations of the power supply device according to the seventh embodiment and three kinds of power supply devices among the power supply devices according to the first to sixth embodiments, there are nine combinations of the power supply device according to the seventh embodiment and four kinds of power supply devices among the power supply devices according to the first to sixth embodiments, and there are two combinations of the power supply device according to the seventh embodiment and five kinds of power supply devices among the power supply devices according to the first to sixth embodiments.

Eighth Embodiment

Figure 7A:
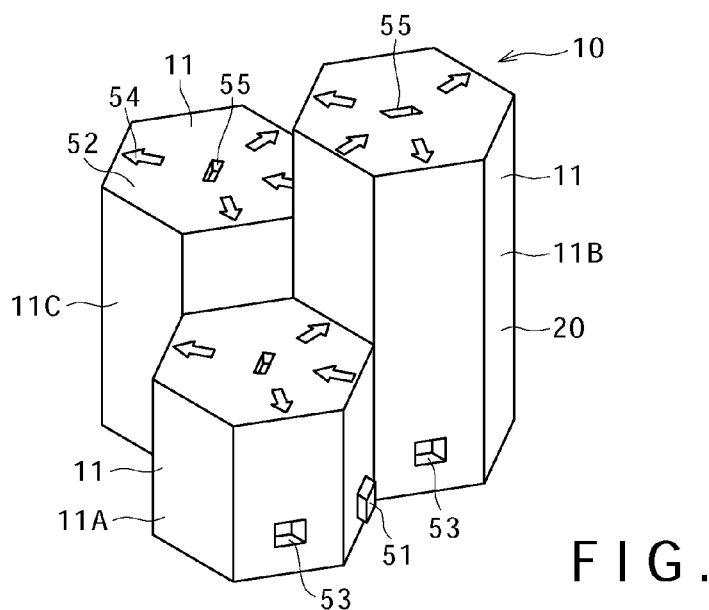
FIG. 7A, FIG. 7B, and FIG. 7C are respectively a schematic perspective view of a power supply unit group formed by combining three power supply units according to an eighth embodiment with each other, a schematic diagram of the power supply unit group as viewed from above, and a schematic diagram of the inside of a power supply unit.
Figure 7B:
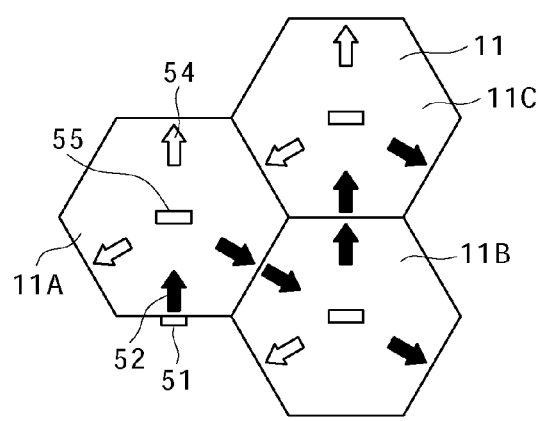
Figure 7C:
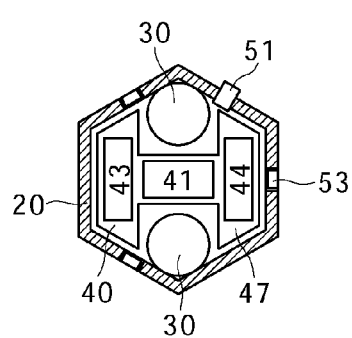
Figure 8:
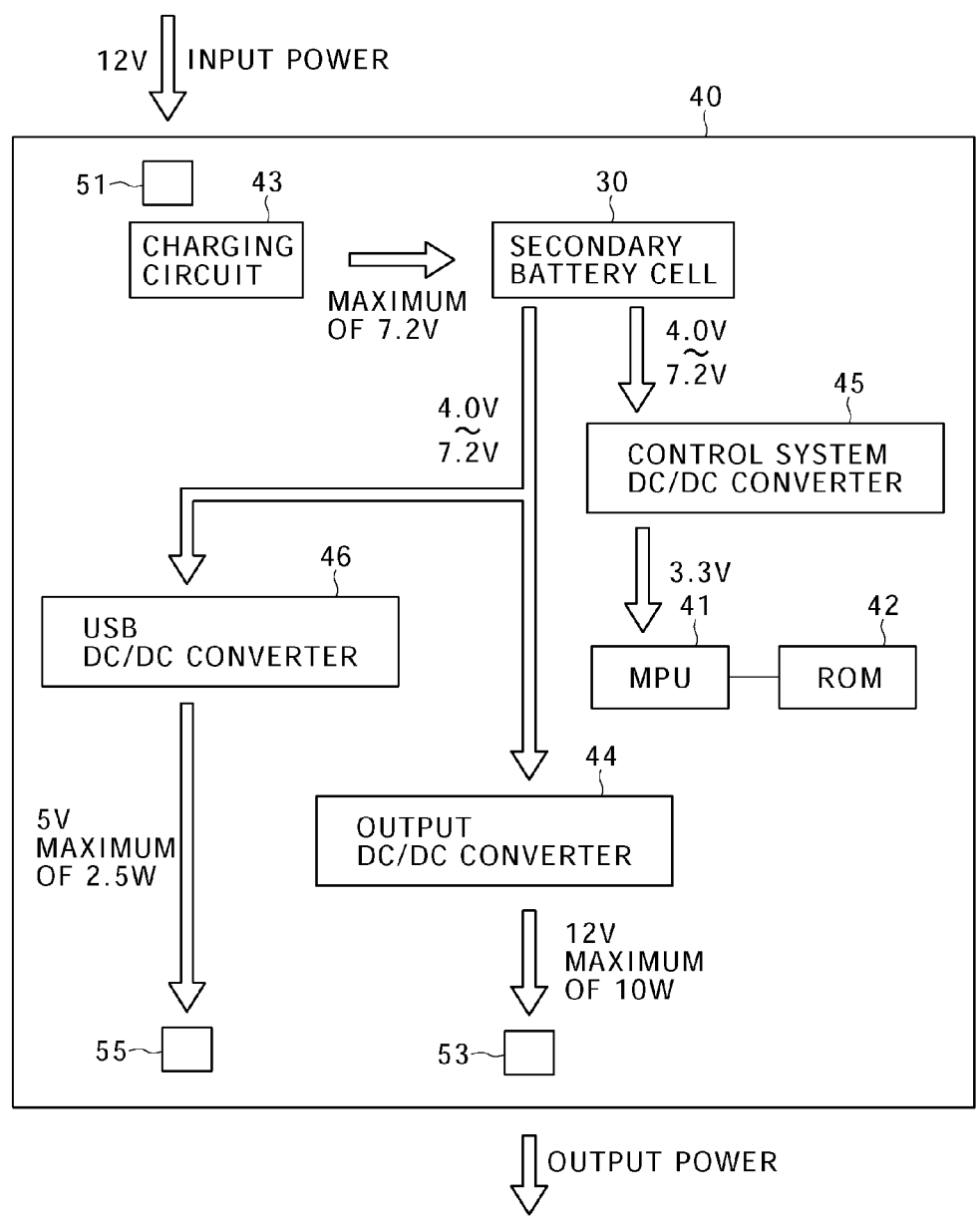
FIG. 8 is a block diagram of a charge and discharge controlling device in a power supply unit according to the eighth embodiment.

An eighth embodiment is a modification of the first to seventh embodiments, and relates to a power supply unit in one embodiment. FIG. 7A is a schematic perspective view of a power supply unit group formed by combining power supply units according to the eighth embodiment with each other. FIG. 7B is a schematic diagram of the power supply unit group as viewed from above. FIG. 7C is a schematic diagram of the inside of a power supply unit. In addition, FIG. 8 is a block diagram of a charge and discharge controlling device.

A power supply unit 11 according to the eighth embodiment includes:

(A) a casing 20 having a shape of a prism;

(B) a secondary battery cell 30 housed within the casing 20;

(C) a charge and discharge controlling device 40 housed within the casing 20 and connected to the secondary battery cell 30;

(D) at least one power input section 51 disposed in the casing 20 and connected to the charge and discharge controlling device 40; and (E) at least one power output section 53 disposed in the casing 20 and connected to the charge and discharge controlling device 40.

Incidentally, the charge and discharge controlling device 40 doubles as a power supply unit control device and a transmitting and receiving device. In the eighth embodiment, the power supply unit group 10 is formed by combining three power supply units 11A, 11B, and 11C. However, the number of power supply units 11 is not limited to this.

The casing 20 of the power supply unit 11 according to the eight embodiment has a shape such that a plurality of casings 20 can be arranged without a space between the plurality of casings 20. Specifically, the casing 20 has the shape of a regular hexagonal prism. Specifically, a sectional shape when the casing 20 is sectioned in an imaginary plane orthogonal to the axis of the casing 20 is a regular hexagonal prism. Then, the power input section 51 is provided in an odd-numbered side face of the casing 20 having the shape of the regular hexagonal prism, and the power output section 53 is provided in an even-numbered side face of the casing 20 having the shape of the regular hexagonal prism. Incidentally, while the illustrated example is a configuration including one power input section 51 and three power output sections 53, the power supply unit 11 according to the eighth embodiment is not limited to this. The power input section 51 and the power output sections 53 are connected to the charge and discharge controlling device 40 via wiring not shown in the figures. In FIG. 7A, the three power supply units 11 are different from each other in height. This is because the three power supply units 11 are different from each other in capacity, that is, different from each other in the number of secondary battery cells 30 housed within the casing 20. The casing 20 is molded of a plastic material such as an ABS resin or the like.

The power supply unit 11 according to the eighth embodiment further includes:

(F) at least one information input section disposed in the casing 20 and connected to the charge and discharge controlling device 40; and (G) at least one information output section disposed in the casing 20 and connected to the charge and discharge controlling device 40.

The information input section and the information output section are specifically formed by a USB terminal section 55. More specifically, for example, the information input section is formed by a USB terminal, and the information output section is formed by a USB socket. The USB terminal section 55 is connected to the charge and discharge controlling device 40 via wiring not shown in the figures. When the information input sections and the information output sections of a plurality of power supply units 11 are connected to each other by a USB cable, information can be exchanged between the plurality of power supply units 11. In addition, when the information output section of one of the power supply units 11 is connected to a control device (not shown) formed by a personal computer, for example, by a USB cable, control of the plurality of power supply units 11 by the control device, sending and receiving, exchanges and the like of information in the plurality of power supply units 11, checks of states of operation of the plurality of power supply units 11, and display of the states of operation of the plurality of power supply units 11, for example, are made possible. Incidentally, the control device and each of the power supply units 11 are connected to each other via ZigBee, for example, as described above.

In some cases, the power input section 51 may be formed by a USB terminal section and the power output section 53 may be formed by a USB terminal section fitted to the power input section 51 formed by the USB terminal section. Specifically, for example, it suffices to form the power input section 51 and the power output section 53 of a micro USB terminal and a micro USB socket, respectively, or form the power output section 53 and the power input section 51 of a micro USB terminal and a micro USB socket, respectively.

In the power supply unit 11 according to the eighth embodiment, the charge and discharge controlling device 40 includes a well known integrated circuit for charge and discharge control (charging circuit) 43 and a well known DC-to-DC converter (output DC-to-DC converter) 44. The charge and discharge controlling device 40 further includes an MPU 41, a storage device 42 formed by an EEROM, a control system DC-to-DC converter 45, and a USB DC-to-DC converter 46. For example, the integrated circuit (charging circuit) 43 is supplied with an input power with a voltage of 12 volts from an external power supply such as a commercial power supply, a solar battery, or the like via the power input section 51. Then, the secondary battery cell 30 formed by a lithium-ion secondary battery cell is charged by a well known operation of the integrated circuit (charging circuit) 43. Power is supplied from the secondary battery cell 30 to the MPU 41 and the storage device 42 via the control system DC-to-DC converter 45. In addition, power is supplied from the secondary battery cell 30 to the outside via the output DC-to-DC converter 44 and the power output section 53, and also power is supplied to the USB terminal section 55 via the USB DC-to-DC converter 46. Incidentally, the MPU 41 and the like are mounted on a printed wiring board 47.

The power input section 51 and the power output section 53 have such a structure as to be fitted to each other. Specifically, for example, the power input section 51 has a structure in the shape of a projection, and the power output section 53 has a structure in the shape of a depression. The power input sections 51 and the power output sections 53 of power supply units 11 adjacent to each other are fitted to each other, whereby a power supply unit group 10 can be obtained in which the plurality of power supply units 11 are combined with each other. The charge and discharge controlling device 40 has such a structure as to be able to detect the fitted state of the power input section 51 and the power output section 53 by a detecting device (for example a switch or the like) not shown in the figures.

In addition, in the power supply unit 11, an input display device 52 for displaying the presence or absence of power input, the input display device 52 being connected to the charge and discharge controlling device 40, is disposed in the vicinity of the power input section 51, and an output display device 54 for displaying the presence or absence of power output, the output display device 54 being connected to the charge and discharge controlling device 40, is disposed in the vicinity of the power output section 53. The input display device 52 and the output display device 54 include a display section formed of a member transmitting light in the shape of an arrow and a light emitting element (not shown) disposed on the inside of the display section. The light emitting elements can be specifically formed by an LED, for example. The input display device 52 and the output display device 54 are disposed in a top face of the casing 20. The light emitting elements are connected to the charge and discharge controlling device 40 via wiring, and the turning on/off of the light emitting elements is controlled by the charge and discharge controlling device 40. More specifically, the charge and discharge controlling device 40 checks states of fitting of the power input section 51 and the power output section 53, and further detects a flow of current between the power input section 51 and the power output section 53. On the basis of a result of the detection, the charge and discharge controlling device 40 controls the turning on/off of the light emitting elements. In FIG. 7B, the input display device 52 shown as black arrows indicate that power is supplied (input) from an external power supply to the power input sections 51 disposed in the vicinity of the input display device 52. In addition, the output display device 54 shown as black arrows indicate that power is supplied (output) from the power output sections 53 disposed in the vicinity of the output display device 54 to the outside or adjacent power supply units 11. The same is also true in the following description. The casing 20 of the power supply unit 11 may be provided with a charge state display device (not shown) for displaying a charge state, the charge state display device being formed by an LED, and a discharge state display device or a remaining amount display device (not shown) for displaying a discharge state, the discharge state display device or the remaining amount display device being formed by an LED, the charge state display device and the discharge state display device or the remaining amount display device may be connected to the charge and discharge controlling device 40, and the operation of the charge state display device and the discharge state display device or the remaining amount display device may be controlled by the charge and discharge controlling device 40. Alternatively, the input display device 52 and the output display device 54 may double as the charge state display device and the discharge state display device or the remaining amount display device. In this case, the functions of the charge state display device and the discharge state display device or the remaining amount display device can be performed by states of blinking of the light emitting elements, for example.

In the power supply unit group 10 according to the eighth embodiment, power is supplied from an external power supply via the power input section 51 in one part to charge the secondary battery cells 30 in the three power supply units 11. In addition, power is supplied (output) to a power consuming appliance 13 via the power output section 53 in one part or two parts to drive the power consuming appliance 13.

In the eighth embodiment, the casings 20 of the power supply units 11 have the shape of a prism (specifically a regular hexagonal prism), and the plurality of power supply units 11 can be combined with each other without any space between the plurality of power supply units 11. In addition, the plurality of power supply units 11 can be combined with each other easily by connecting power input sections 51 and power output sections 53 of the power supply units 11 adjacent to each other. In addition, for example, a plurality of various power supply units 11 different in capacity can be combined with each other and used as one power supply unit group 10 as a whole, that is, can be used as one power supply unit group 10 as a whole in a state of being mixed with each other.

Ninth Embodiment

A ninth embodiment is a modification of the power supply devices according to the first to seventh embodiments. The power supply device according to the ninth embodiment further includes a portable terminal including a display device, and a control device and the portable terminal are connected to each other by a communicating circuit. Examples of the portable terminal in this case include a portable telephone, a PDA, and a notebook personal computer. Thereby, the state of operation of the power supply device can be checked even at a remote place. Further, a configuration can be formed in which mutual authentication is performed between the control device and the portable terminal at a time of connection, a cryptographic key is shared between the control device and the portable terminal, and communication encrypted by the cryptographic key is performed between the control device and the portable terminal. Incidentally, concrete examples of authentication include a combination of an ID and a password and an authentication system defined in ISO/IEC 9798. When the authentication has succeeded, a cryptographic key for a session between the control device and the portable terminal is shared between the control device and the portable terminal, and encryption and authentication of communication data are performed.

Because the control device thus authenticates the portable terminal, it is possible to prevent unauthorized operation of the control device from a remote place while an unauthorized portable terminal is connected to the control device, or prevent the state of each device controlled by the control device from being leaked to a third party through an unauthorized portable terminal. On the other hand, by authenticating the control device, the portable terminal can confirm that the portable terminal is connected to the authorized control device, and prevent (privacy) information indicating control and operation from the portable terminal from being leaked to a third party through a false control device. In addition, because communication data is encrypted, the state of each device controlled by the control device (for example the states of devices within the house) and information on control and operation from the portable terminal (for example a history of action), which are exchanged between the control device and the portable terminal, can be prevented from being wiretapped from the communicating circuit. In addition, because communication data is authenticated, manipulations and errors in the communication data due to intentional acts, negligence, accidents and the like on the communicating circuit can be detected.

While the present technology has been described on the basis of preferred embodiments, the present technology is not limited to these embodiments. The constitutions, structures, and casings of the power supply devices, the power supply units, and the power supply unit groups in the embodiments and the constitutions and structures of the secondary battery cells, the charge and discharge controlling device, the power input section, and the power output section are illustrative, and can be changed as appropriate.

Incidentally, a configuration can be adopted in which a power supply device includes a power generating device and a control device configured to control the power generating device, the control device and the power generating device are connected to each other by a communicating circuit, when communication between the power generating device and the control device is blocked, the control device updates a cryptographic key shared to perform communication between the control device and the power generating device, and when the communication between the power generating device and the control device is restored, the control device checks whether the power generating device in question is the power generating device when the communication between the power generating device and the control device was blocked, and when the power generating device in question is the power generating device when the communication between the power generating device and the control device was blocked, the control device sends the cryptographic key to the power generating device in question. Incidentally, in this case, the power supply device can take a form in which when an authorized power generating device, the authorized power generating device not being a power generating device removed from a power supply unit group, is incorporated into the power supply unit group, the control device checks whether the power generating device in question is an authorized power generating device, and when the power generating device in question is an authorized power generating device, the control device sends the cryptographic key to the power generating device in question. In addition, in such a configuration or form, the power supply device can take a form in which when an unauthorized power generating device is incorporated into the power supply unit group, the control device checks whether the power generating device in question is an authorized power generating device, and when the power generating device in question is an unauthorized power generating device, the control device does not send the cryptographic key to the power generating device in question, and blocks communication between the control device and the power generating device in question.

Alternatively, a configuration can be adopted in which a power supply device includes a power consuming appliance and a control device configured to control the power consuming appliance, the control device and the power consuming appliance are connected to each other by a communicating circuit, when communication between the power consuming appliance and the control device is blocked, the control device updates a cryptographic key shared to perform communication between the control device and the power consuming appliance, and when the communication between the power consuming appliance and the control device is restored, the control device checks whether the power consuming appliance in question is the power consuming appliance when the communication between the power consuming appliance and the control device was blocked, and when the power consuming appliance in question is the power consuming appliance when the communication between the power consuming appliance and the control device was blocked, the control device sends the cryptographic key to the power consuming appliance in question. Incidentally, in this case, the power supply device can take a form in which when an authorized power consuming appliance, the authorized power consuming appliance not being the power consuming appliance when the communication between the power consuming appliance and the control device was blocked, is connected to the control device by the communicating circuit, the control device checks whether the power consuming appliance in question is an authorized power consuming appliance, and when the power consuming appliance in question is an authorized power consuming appliance, the control device sends the cryptographic key to the power consuming appliance in question. In addition, in such a configuration or form, the power supply device can take a form in which when an unauthorized power consuming appliance is connected to the control device by the communicating circuit, the control device checks whether the power consuming appliance in question is an authorized power consuming appliance, and when the power consuming appliance in question is an unauthorized power consuming appliance, the control device does not send the cryptographic key to the power consuming appliance in question, and blocks communication between the control device and the power consuming appliance in question.

In the power supply unit described in the eighth embodiment, the at least one power input section and the at least one power output section disposed in the casing 20 and connected to the charge and discharge controlling device 40 can also be formed from a magnetic resonance system, for example. Specifically, it suffices to incorporate a power transmission apparatus such as a high-frequency power supply circuit, a matching circuit or the like and a power reception apparatus such as a matching circuit, a high-speed rectifying circuit, a power converting circuit or the like into the charge and discharge controlling device 40, and form the power output section of a power transmission device connected to the matching circuit forming the power transmission apparatus and form the power input section of a power reception device connected to the matching circuit forming the power reception apparatus.

Figure 9A:
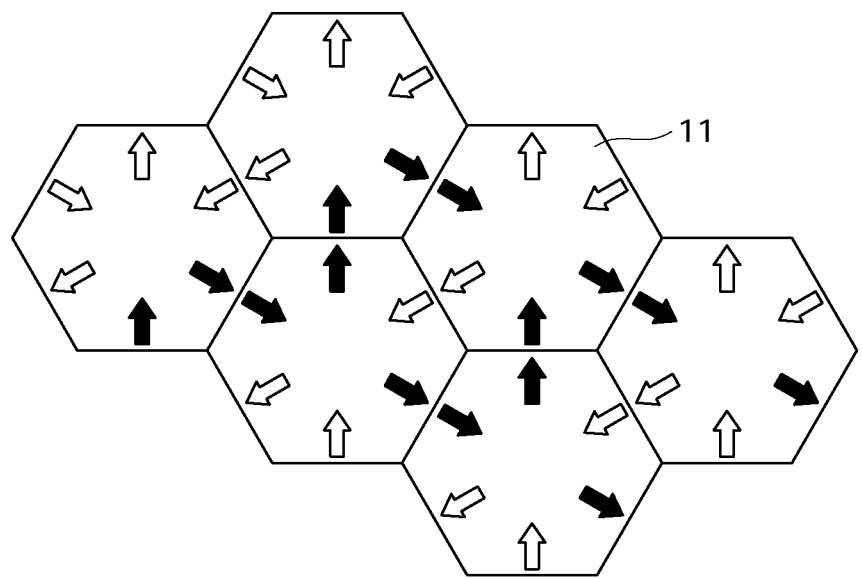
FIG. 9A and FIG. 9B are respectively a schematic diagram of a power supply unit group as viewed from above, the power supply unit group being formed by combining six power supply units in one embodiment with each other, and a schematic perspective view of a power supply unit having a casing in the shape of a regular triangular prism.

As shown in FIG. 9A, for example, a power supply unit group can also be formed by combining six power supply units in one embodiment with each other. Incidentally, FIG. 9A is a schematic diagram of such a power supply unit group as viewed from above. In the illustrated example, each power supply unit has three power input sections and three power output sections.

Figure 9B:
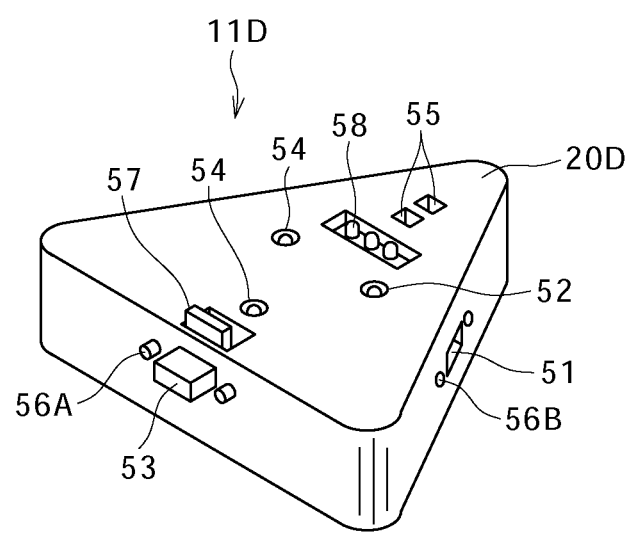

In addition, as shown in FIG. 9B, a power supply unit 11D having a casing 20D in the shape of a regular triangular prism can also be formed. In this case, a reference 56A denotes a pin, and a reference 56B denotes a hole part to be fitted to the pin 56A. Thus fitting the pin 56A and the hole part 56B to each other can prevent an excessive force from being applied to a power input section 51 and a power output section 53 when the power supply units 11 are combined. In addition, a reference 57 denotes a knob for taking in and out the power output section 53. Further, a reference 58 denotes a display device doubling as a charge state display device and a discharge state display device or a remaining amount display device. The display device is formed by arranging a plurality of LEDs. The display device 58 is connected to a charge and discharge controlling device 40.

Figure 10A:
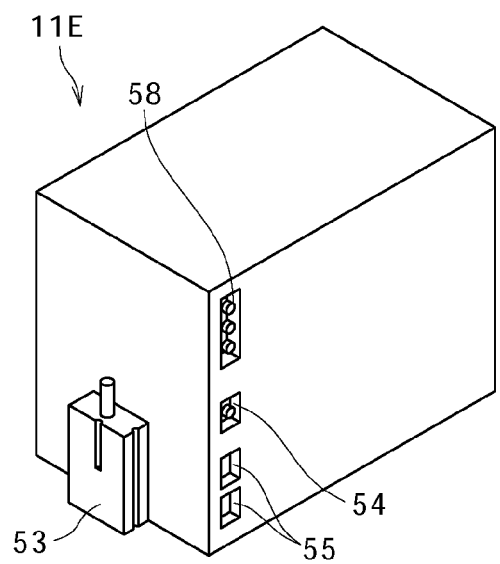
FIG. 10A and FIG. 10B are respectively a schematic perspective view of a power supply unit having a casing in the shape of a quadratic prism and a conceptual diagram of a power supply unit group as viewed from a bottom surface side, the power supply unit group being formed by combining three such power supply units with each other.
Figure 10B:
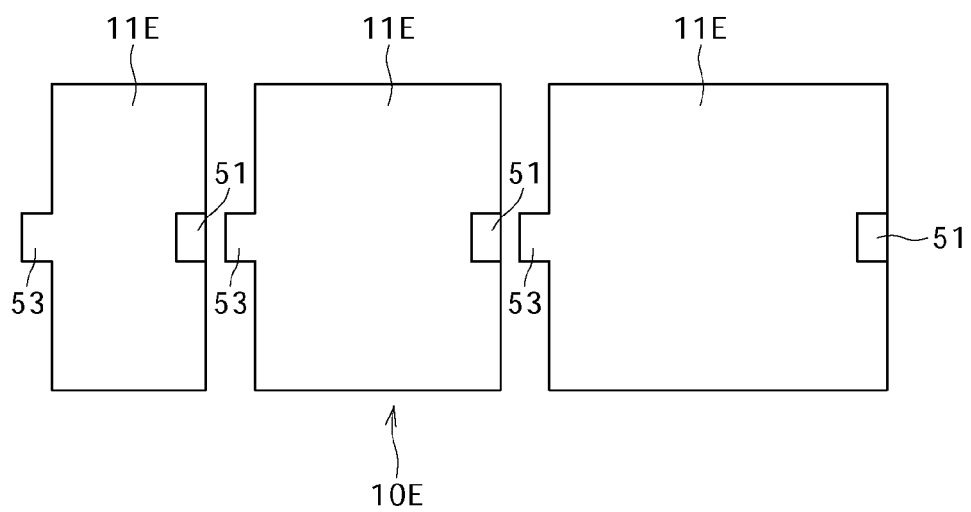

Alternatively, as shown in a schematic perspective view of FIG. 10A, a power supply unit 11E having a casing in the shape of a quadratic prism (shape of a rectangular parallelepiped) can also be formed. Incidentally, FIG. 10B is a conceptual diagram of a power supply unit group 10E as viewed from a bottom surface side, the power supply unit group 10E being formed by combining three such power supply units 11E with each other.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A power supply device comprising:
    (a) a power supply unit group composed of a plurality of power supply units and connected with a power consuming appliance; and
    (b) a control device configured to control the power supply unit group, wherein the control device and each of the power supply units are connected to each other by a communicating circuit, wherein
    when a power supply unit is removed from the power supply unit group, the control device updates a cryptographic key shared to perform communication between the control device and each of the power supply units, wherein
    when the power supply unit is returned to the power supply unit group, the control device checks whether the power supply unit returned to the power supply unit group is the power supply unit removed from the power supply unit group, and when the power supply unit returned to the power supply unit group is the power supply unit removed from the power supply unit group, the control device sends the cryptographic key to the power supply unit returned to the power supply unit group, and wherein
    when a power supply unit that is not the power supply unit removed from the power supply unit group is incorporated into the power supply unit group, the control device checks whether the power supply unit that is not the power supply unit removed from the power supply unit group is an authorized or an unauthorized power supply unit,
    wherein, when the power supply unit that is not the power supply unit removed from the power supply unit group is an authorized power supply unit, the control device sends the cryptographic key to the power supply unit that is not the power supply unit removed from the power supply unit group,
    and when the power supply unit that is not the power supply unit removed from the power supply unit group is an unauthorized power supply unit, the control device does not send the cryptographic key to the power supply unit that is not the power supply unit removed from the power supply unit group and blocks communication between the control device and the power supply unit that is not the power supply unit removed from the power supply unit group.

2. The power supply device according to claim 1, further comprising: a power generating device, wherein
    the control device and the power generating device are connected to each other by a communicating circuit, when communication between the power generating device and the control device is blocked, the control device updates the cryptographic key, and
        when the communication between the power generating device and the control device is restored, the control device checks whether the power generating device is the power generating device when the communication between the power generating device and the control device was blocked, and when the power generating device is the power generating device when the communication between the power generating device and the control device was blocked, the control device sends the cryptographic key to the power generating device.

3. The power supply device according to claim 2, wherein when a power generating device that is not the power generating device of claim 2 is connected to the control device by a communicating circuit, the control device checks whether the power generating device that is not the power generating device of claim 2 is an authorized power generating device, and when the power generating device that is not the power generating device of claim 2 is an authorized power generating device, the control device sends the cryptographic key to the power generating device that is not the power generating device of claim 2.

4. The power supply device according to claim 2, wherein when a power generating device that is not the power generating device of claim 2 is connected to the control device by a communicating circuit, the control device checks whether the power generating device that is not the power generating device of claim 2 is an authorized power generating device, and when the power generating device that is not the power generating device of claim 2 is an unauthorized power generating device, the control device does not send the cryptographic key to the power generating device that is not the power generating device of claim 2 and blocks communication between the control device and the power generating device that is not the power generating device of claim 2.

5. The power supply device according to claim 1, wherein the control device and the power consuming appliance are connected to each other by a communicating circuit, when communication between the power consuming appliance and the control device is blocked, the control device updates the cryptographic key, and when the communication between the power consuming appliance and the control device is restored, the control device checks whether the power consuming appliance is the power consuming appliance when the communication between the power consuming appliance and the control device was blocked, and when the power consuming appliance is the power consuming appliance when the communication between the power consuming appliance and the control device was blocked, the control device sends the cryptographic key to the power consuming appliance.

6. The power supply device according to claim 5, wherein when a power consuming appliance that is not the power consuming appliance of claim 5 is connected to the control device by a communicating circuit, the control device checks whether the power consuming appliance that is not the power consuming appliance of claim 5 is an authorized power consuming appliance, and when the power consuming appliance that is not the power consuming appliance of claim 5 is an authorized power consuming appliance, the control device sends the cryptographic key to the power consuming appliance that is not the power consuming appliance of claim 5.

7. The power supply device according to claim 5, wherein when a power consuming appliance that is not the power consuming appliance of claim 5 is connected to the control device by a communicating circuit, the control device checks whether the power consuming appliance that is not the power consuming appliance of claim 5 is an authorized power consuming appliance, and when the power consuming appliance that is not the power consuming appliance of claim 5 is an unauthorized power consuming appliance, the control device does not send the cryptographic key to the power consuming appliance that is not the power consuming appliance of claim 5 and blocks communication between the control device and the power consuming appliance that is not the power consuming appliance of claim 5.

8. The power supply device according to claim 1, wherein the power supply units include:
(A) a casing having a shape of a prism;
(B) a secondary battery cell housed within the casing;
(C) a charge and discharge controlling device housed within the casing and connected to the secondary battery cell;
(D) at least one power input section disposed in the casing and connected to the charge and discharge controlling device; and
(E) at least one power output section disposed in the casing and connected to the charge and discharge controlling device.

* * * * *